United States Patent
Deckman et al.

(10) Patent No.: US 10,879,998 B1
(45) Date of Patent: Dec. 29, 2020

(54) RATE ADAPTIVE REFERENCE SYNTHESIZER FOR FREQUENCY CONVERTERS USED IN SATELLITE COMMUNICATION SYSTEMS

(71) Applicant: Mission Microwave Technologies, LLC, Santa Fe Springs, CA (US)

(72) Inventors: Blythe C. Deckman, Santa Fe Springs, CA (US); Michael P. DeLisio, Jr., Santa Fe Springs, CA (US)

(73) Assignee: MISSION MICROWAVE TECHNOLOGIES, LLC, Santa Fe Springs, CA (US)

( * ) Notice: Subject to any disclaimer, the term of this patent is extended or adjusted under 35 U.S.C. 154(b) by 0 days.

(21) Appl. No.: 16/830,790

(22) Filed: Mar. 26, 2020

(51) Int. Cl.
*H04B 7/185* (2006.01)
*H04B 1/00* (2006.01)

(52) U.S. Cl.
CPC ....... *H04B 7/18515* (2013.01); *H04B 1/0057* (2013.01); *H04B 1/0071* (2013.01); *H04B 1/0082* (2013.01)

(58) Field of Classification Search
CPC .............. H04B 7/18515; H04B 1/0057; H04B 1/0071; H04B 1/0082
See application file for complete search history.

(56) References Cited

U.S. PATENT DOCUMENTS

| | | | | |
|---|---|---|---|---|
| 5,473,274 A | * | 12/1995 | Reilly | H03L 7/113 327/155 |
| 6,249,155 B1 | * | 6/2001 | Hartman | H03B 21/02 327/106 |
| 6,480,557 B1 | * | 11/2002 | Rog | G01S 5/0027 342/357.64 |
| 8,786,315 B2 | * | 7/2014 | Nesreen | H03L 7/0891 327/5 |
| 9,094,908 B1 | * | 7/2015 | Shor | H04W 56/0015 |
| 9,651,675 B2 | * | 5/2017 | Karaoguz | G01S 19/36 |
| 9,692,464 B1 | * | 6/2017 | Cheng | H04B 1/0475 |
| 2005/0002343 A1 | * | 1/2005 | Toncich | H04B 1/44 370/282 |
| 2005/0245205 A1 | * | 11/2005 | Huang | H03L 7/06 455/95 |
| 2008/0146175 A1 | * | 6/2008 | Rakshani | H04B 1/0014 455/129 |
| 2009/0010370 A1 | * | 1/2009 | Hamaminato | H04L 27/2675 375/359 |

(Continued)

*Primary Examiner* — Dominic E Rego
(74) *Attorney, Agent, or Firm* — Christopher P. Maiorana, PC

(57) ABSTRACT

An apparatus comprising a frequency standard circuit and a tracking circuit. The frequency standard circuit may be configured to generate an internal frequency standard and adjust the internal frequency standard in response to a tuning signal. The tracking circuit may be configured to receive a reference signal from an external source and a feedback signal of the internal frequency standard and generate the tuning signal. The tuning signal may be configured to synchronize the internal frequency standard to the reference signal. The internal frequency standard may be implemented local to a frequency converter. The tracking circuit may have a bandwidth that prevents unwanted content on the reference signal from corrupting the internal frequency standard.

20 Claims, 13 Drawing Sheets

(56) References Cited

U.S. PATENT DOCUMENTS

| | | | | |
|---|---|---|---|---|
| 2011/0181366 | A1* | 7/2011 | Schoepf | H03L 7/16 |
| | | | | 331/18 |
| 2011/0212718 | A1* | 9/2011 | Schoepf | H03L 7/16 |
| | | | | 455/422.1 |
| 2012/0063520 | A1* | 3/2012 | Deguchi | H03L 7/1803 |
| | | | | 375/259 |
| 2016/0080140 | A1* | 3/2016 | Gach | H04L 7/0331 |
| | | | | 375/360 |
| 2016/0182065 | A1* | 6/2016 | Wicpalek | H03L 7/085 |
| | | | | 327/156 |
| 2016/0336848 | A1* | 11/2016 | Meola | H02M 3/04 |
| 2017/0324419 | A1* | 11/2017 | Mayer | H03L 7/235 |
| 2018/0199299 | A1* | 7/2018 | Wakabayashi | H04W 56/002 |
| 2019/0348988 | A1* | 11/2019 | Kim | H03L 7/0805 |

\* cited by examiner

RATE ADAPTIVE REFERENCE SYNTHESIZER FOR FREQUENCY CONVERTERS USED IN SATELLITE COMMUNICATION SYSTEMS

FIELD OF THE INVENTION

The invention relates to communication systems generally and, more particularly, to a method and/or apparatus for implementing a rate adaptive reference synthesizer for frequency converters used in satellite communication systems.

BACKGROUND

Many communication systems use frequency converters. Multi-channel communication systems rely on frequency converters to locate individual transmissions within specific channel allotments. Satellite systems are one variety of multi-channel communication systems.

Converters rely on standards to ensure adequate frequency accuracy and prevent unintentional overlap among channel assignments. Synchronizing a frequency converter to a standard involves deriving a conversion signal local to the converter (i.e., a local oscillator) from the standard. Deriving a conversion signal from the standard is usually extremely sensitive to noise and interference that may be present on the reference. The sensitivity of a converter to unwanted content on the supplied reference is a function of a tracking bandwidth of the converter.

Frequently used circuits, particularly circuits found in lower-cost systems, use converters that have a tracking bandwidth that greatly multiplies spurious reference signal content. Spurious reference signal content can significantly corrupt the derived local oscillator signal. Many common features of satellite communication systems can introduce enough spurious content on the frequency standard to render the derived local oscillator entirely useless. Some features that are particularly problematic include: use of optical circuits to carry the reference signal to the frequency converter; use of a bias-T to mix prime power to the converter with a reference signal; and use of high-speed bursting data signals supplied along with the reference on a single cable.

It would be desirable to implement a rate adaptive reference synthesizer for frequency converters used in satellite communication systems.

SUMMARY

The invention concerns an apparatus comprising a frequency standard circuit and a tracking circuit. The frequency standard circuit may be configured to generate an internal frequency standard and adjust the internal frequency standard in response to a tuning signal. The tracking circuit may be configured to receive a reference signal from an external source and a feedback signal of the internal frequency standard and generate the tuning signal. The tuning signal may be configured to synchronize the internal frequency standard to the reference signal. The internal frequency standard may be implemented local to a frequency converter. The tracking circuit may have a bandwidth that prevents unwanted content on the reference signal from corrupting the internal frequency standard.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a rate adaptive reference synthesizer for frequency converters used in satellite communication systems that may (i) avoid signal degradations from the external reference, (ii) filter unwanted content present on the external reference, (iii) implement a tracking circuit with a bandwidth sufficiently low to be insensitive to undesirable signal content, (iv) derive a local oscillator frequency, (v) implement an error signal memory, (vi) implement a digital tracking system, (vii) implement a phase-locked loop, (viii) implement a high-purity local oscillator, (ix) synchronize a low-noise signal with a noisy reference signal and/or (x) be implemented as one or more integrated circuits.

Embodiments of the present invention may be configured to implement a high-quality frequency standard local to a frequency converter that may be synchronized to an external reference signal. Synchronizing the local frequency standard to some external reference signal may ensure that adequate frequency accuracy will be maintained during the operation of the frequency converter. Implementing the high-quality frequency standard locally may filter out spurious content that may result in signal degradations associated with use of an external reference to synchronize a local oscillator of a frequency converter.

Embodiments of the present invention may synchronize the local standard to the external reference such that unwanted content present on the external reference does not corrupt the local standard. A tracking circuit may be used to align an internal standard to the external reference. Generally, a bandwidth of the tracking circuit used to align the internal standard to the external reference may be held sufficiently low in order to remain functionally insensitive to undesirable signal content that may be carried by the reference signal.

Figure 1:
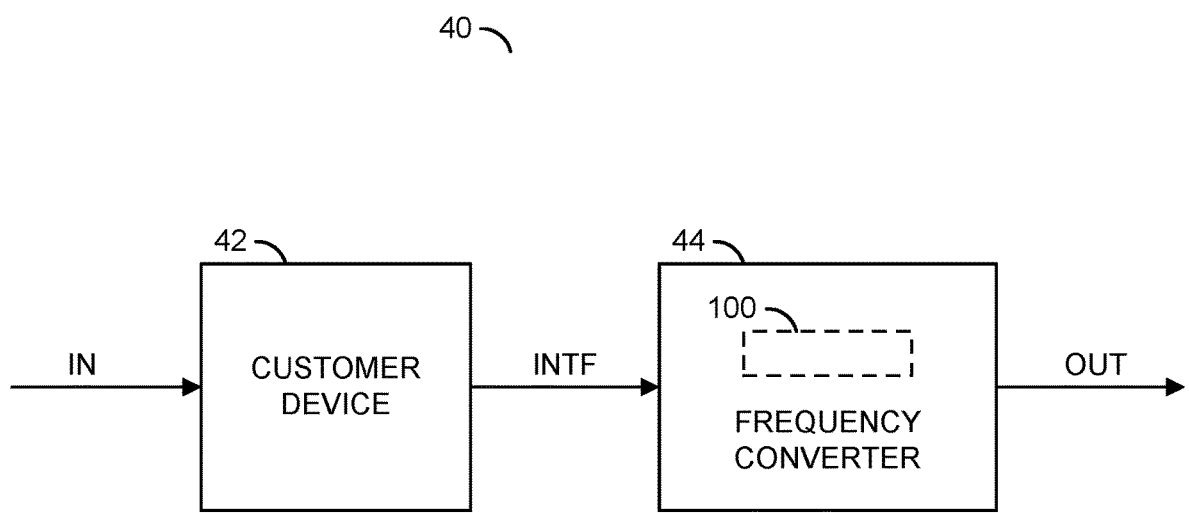
FIG. 1 is a diagram illustrating a context of the present invention.

Referring to FIG. 1, a diagram illustrating a context of the present invention is shown. A system 40 is shown. The system 40 may represent a portion of a satellite communication system. The system 40 may comprise a block (or circuit) 42 and/or a block (or circuit) 44. The circuit 42 may implement a customer device. In an example, the customer device 42 may be a modem. The circuit may implement a frequency converter. In an example, the frequency converter 44 may be a satellite frequency converter. The satellite communication system 40 may comprise other components (not shown). The number, type and/or arrangement of components of the satellite communication system 40 may be varied according to the design criteria of a particular implementation.

The modem 42 may be a customer appliance/device. The modem 42 may be located in the home/property of an end user. The modem 42 may enable an end user to communicate with the satellite communication system 40. The modem 42 may receive a signal (e.g., IN). The signal IN may be an input from a user. For example, the signal IN may be a digital stream.

The modem 42 may communicate a signal (e.g., INTF) to the frequency converter 44. The signal INTF may be an interface signal. The signal INTF may carry a combination of data. The signal INTF may comprise one or more of an intermediate frequency signal to be converted by the frequency converter 44, a frequency standard signal and/or a prime power for the satellite frequency converter 44.

The frequency converter 44 may receive the signal INTF. In one example, the frequency converter 44 may be configured for use within a satellite communication system. The frequency converter 44 may be configured to locate individual transmissions within specific channel allotments. The frequency converter 44 may enable the system 40 to operate as a multi-channel communication system.

The frequency converter 44 may comprise an apparatus 100. The apparatus 100 may be implemented as a block, a circuit, a combination of circuits, etc. The apparatus 100 may be an adapter to enable the frequency converter 44 to incorporate a local frequency standard that may be synchronized to an external reference while blocking unwanted signal content carried by the external reference. The external reference may be a component of the signal INTF.

The frequency converter 44 may generate a signal (e.g., OUT). In an example, the signal OUT may be an output signal provided to a satellite communication system. The signal OUT may be generated according to a particular channel assignment. The apparatus 100 may enable the frequency converter 44 to generate the signal OUT having a frequency accuracy that prevents unintentional overlap among channel assignments (e.g., for a satellite communication system). The signal out may be generated partially in response to the local frequency standard controlled by the apparatus 100.

Figure 2:
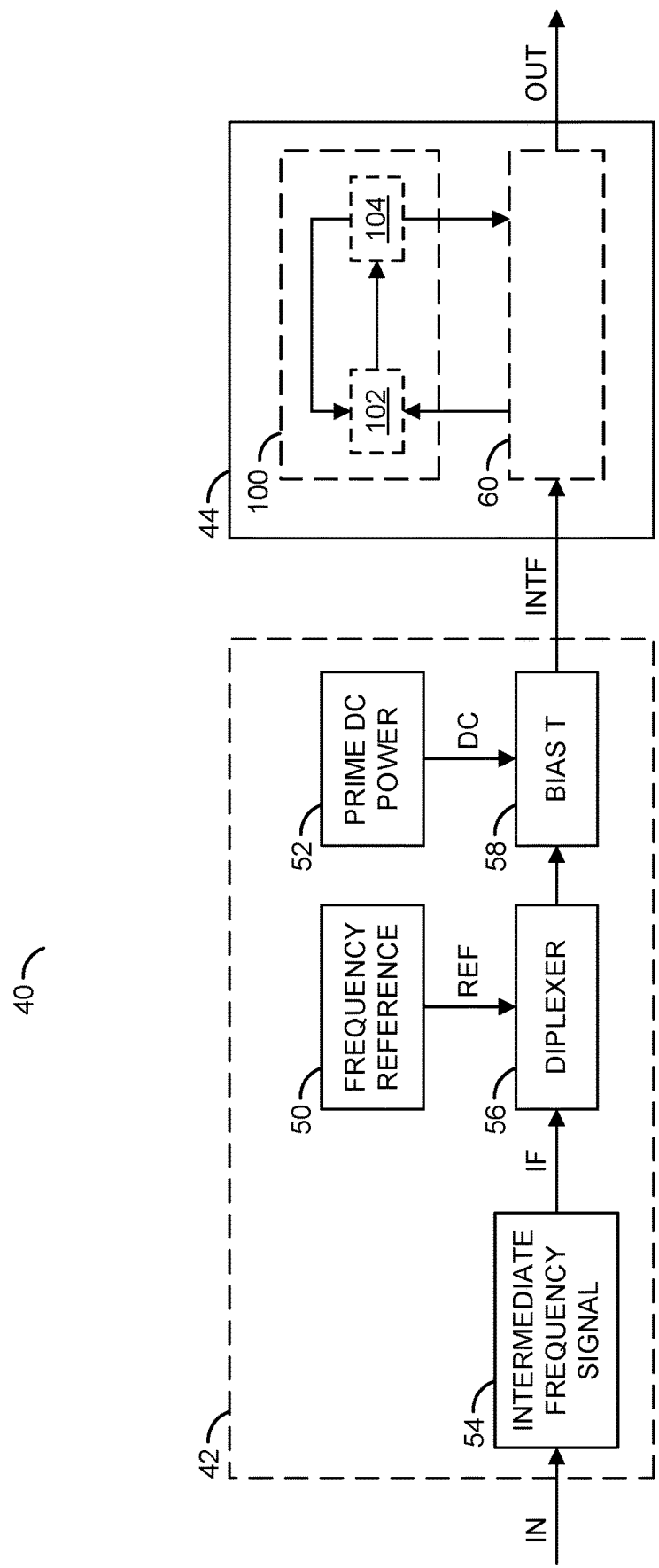
FIG. 2 is a block diagram illustrating an example embodiment of the present invention.

Referring to FIG. 2, a block diagram illustrating an example embodiment of the present invention is shown. The system 40 comprising details of the customer device 42 and the frequency converter 44 is shown. The customer device 42 is shown communicating the signal INTF to the frequency converter 44 in response to the signal IN. The frequency converter 44 may generate the signal OUT in response to the signal INTF.

The client device 42 may comprise a block (or circuit) 50, a block (or circuit) 52, a block (or circuit) 54, a block (or circuit) 56 and/or a block (or circuit) 58. The circuit 50 may implement a frequency reference generator. The circuit 52 may implement a prime DC power supply. The circuit 54 may implement an intermediate frequency signal generator. The circuit 56 may implement a diplexer. The circuit 58 may implement a bias-T circuit. The client device 42 may implement additional and/or alternate components (not shown). The number, type and/or arrangement of the components of the client device 42 may be varied according to the design criteria of a particular implementation.

The frequency reference signal generator 50 may be configured to generate a signal (e.g., REF). The signal REF may be a reference signal. The reference signal REF generated by the frequency reference signal generator 50 may be the external reference used for synchronization of the local frequency standard. In one example, the signal REF may be a 10 MHz reference. The frequency reference signal generator 50 may be implemented using a crystal oscillator, an atomic (e.g., cesium, rubidium, etc.) standard, etc. The signal REF may be communicated to the diplexer 56.

The prime DC power supply 52 may be configured to generate a signal (e.g., DC). The prime DC power supply 52 may be configured to provide a direct current power source for a remote device. The signal DC may be communicated to the bias-T circuit 58.

The intermediate frequency signal generator 54 may be configured to receive the input signal IN. The intermediate frequency signal generator 54 may be configured to generate a signal (e.g., IF). The signal IF may comprise an intermediate frequency. The intermediate frequency signal IF may be a radio signal implemented at the intermediate frequency. In an example, the intermediate frequency signal generator 54 may be a digital modulator configured to transform the digital input stream IN to the radio signal IF. The signal IF may be communicated to the diplexer 56.

The diplexer 56 may be configured to receive the intermediate frequency signal IF from the intermediate frequency signal generator 54 and the reference signal REF from the frequency reference generator 50. The diplexer 56 may perform frequency-domain multiplexing to provide the signal IF and the signal REF to the bias-T circuit 58 without interference.

The bias-T circuit 58 may be configured to receive the intermediate frequency signal IF and the reference signal REF from the diplexer 56 and receive the signal DC from the prime DC power supply 52. The bias-T circuit 58 may be configured to generate the signal INTF in response to the signal DC, the signal IF and the signal REF. For example, the bias-T circuit 58 may pass the high frequency signal IF and the high frequency signal REF and set a DC bias in response to the signal DC. The bias-T circuit 58 may provide an RF signal and DC power to the frequency converter 44 via the signal INTF. In one example, the unwanted content on the signal REF may be caused in response to using the bias-T circuit 58 to mix the prime power with the reference signal REF. In another example, the unwanted content on the signal REF may be caused by the use of optical circuits to carry the signal REF.

The frequency converter 44 may comprise a block (or circuit) 60 and/or the apparatus 100. The circuit 60 may comprise components of a frequency converter. The apparatus 100 may comprise a block (or circuit) 102 and/or a block (or circuit) 104. The circuit 102 may implement a tracking circuit. The circuit 104 may implement a frequency standard circuit. The tracking circuit 102 may be configured to receive the reference signal REF from an external source (e.g., the customer device 42 via the signal INTF). The tracking circuit 102 may be configured to tune the frequency standard circuit 104 to synchronize the frequency standard circuit 104 to the reference signal REF. The frequency standard circuit 104 may be configured to generate an internal frequency standard and adjust the internal frequency standard in response to the tuning signal from the tracking circuit 102. The tracking circuit 102 may be implemented having a bandwidth that may prevent unwanted content on the reference signal REF from corrupting the internal frequency standard. The frequency converter 44 and/or the apparatus 100 may comprise other and/or alternate components (not shown). Details of the components of the frequency converter 44 and/or the apparatus 100 may be described in more detail in association with FIG. 3.

Distortion and noise on the reference signal REF that is within the tracking bandwidth of the frequency converter 44 may be amplified into the output signal OUT by a multiplication ratio of the frequency converter 44. Generally, the multiplication ratio of the frequency converter 44 may be a large number. A large multiplication ratio may significantly amplify distortion and/or noise on the reference signal REF. Noise and/or distortion on the reference signal REF may come from one or more sources. In one example, one source of noise and/or distortion on the reference signal REF may be noise that exists natively on the reference signal REF. In another example, one source of noise and/or distortion on the reference signal REF may be inherently noisy signal transmission media between the customer appliance 42 and the frequency converter 44 (e.g., fiber optic systems may be particularly common and problematic). In yet another example, one source of noise and/or distortion on the reference signal REF may be passive intermodulation in the bias-T circuit 58 between the reference signal REF and ripple on the prime power line for the signal DC. In still another example, one source of noise and/or distortion on the reference signal REF may be nonlinearities in power circuits that may not be deeply isolated from the reference signal REF (e.g., insufficient isolation through even a very linear bias-T circuit 58). In another example, one source of noise and/or distortion on the reference signal REF may be surging bias current resulting from pulsed and/or high peak-to-average RF signaling. The tracking circuit 102 may be implemented with a low and/or adaptive bandwidth in order to filter out noise on the reference signal REF to enable the frequency standard circuit 104 to generate a low-noise local frequency standard that may be in synchronization with the reference signal REF.

Figure 3:
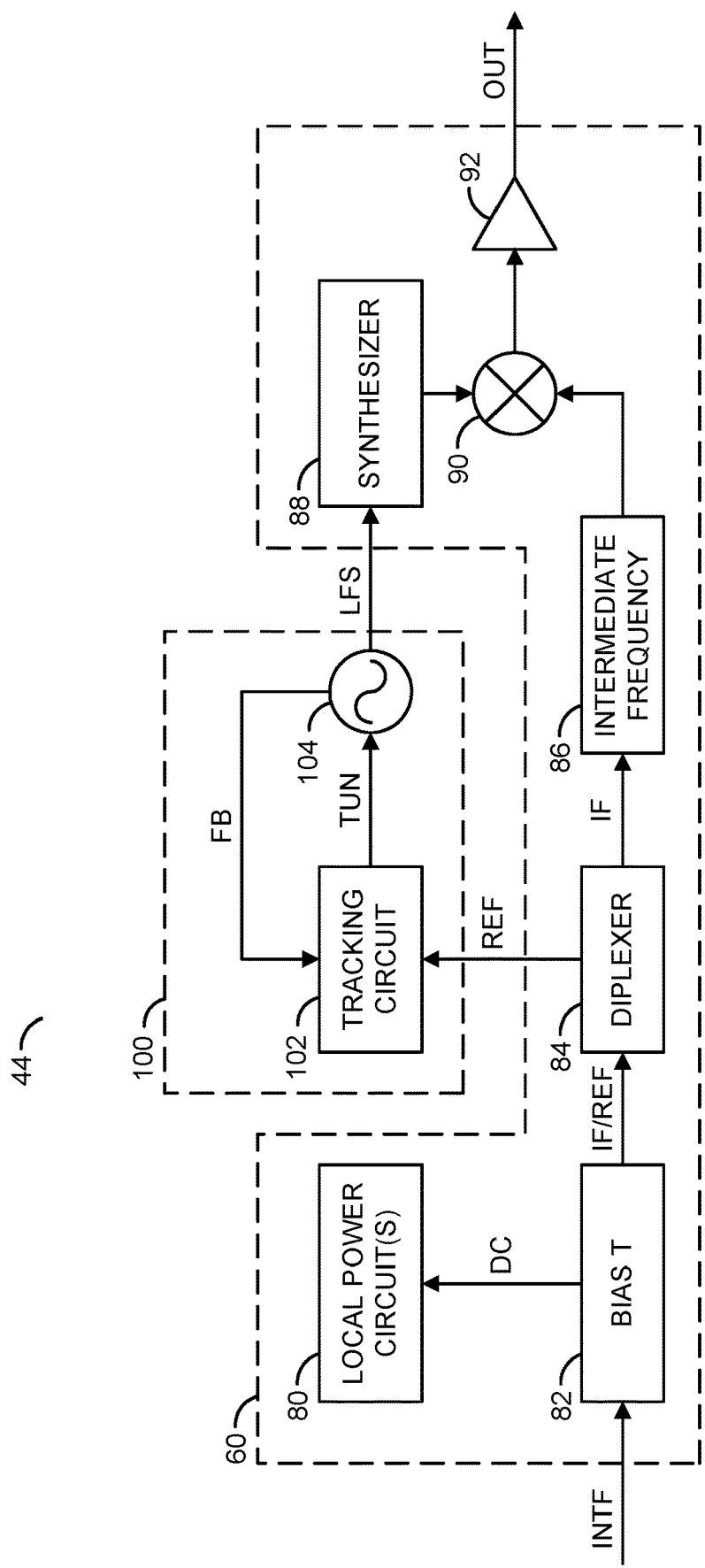
FIG. 3 is a block diagram illustrating a frequency converter modified with the present invention.

Referring to FIG. 3, a block diagram illustrating a frequency converter modified with the apparatus 100 is shown. The components 60 and the apparatus 100 of the frequency converter 44 are shown. The frequency converter 44 may receive the signal INTF. The frequency converter 44 may generate the signal OUT in response to the signal INTF. The apparatus 100 is shown implemented local to the frequency converter 44. For example, the apparatus 100 may be implemented as a component of the frequency converter 44 and/or implemented within a same device (or same circuit board) of the frequency converter 44.

The components 60 may receive the signal INTF and present the signal OUT. In an example, the components 60 may comprise the circuits and/or logic used to implement a satellite communications frequency converter. The apparatus 100 may be configured to provide the local frequency standard that may be used by the components 60. The components 60 may provide the signal REF to the apparatus 100. The apparatus 100 may generate a signal (e.g., LFS). The signal LFS may be received by the components 60. The signal LFS may comprise the local frequency standard.

The components 60 may comprise a block (or circuit) 80, a block (or circuit) 82, a block (or circuit) 84, a block (or circuit) 86, a block (or circuit) 88, a block (or circuit) 90 and/or a block (or circuit) 92. The circuit 80 may implement local power circuit(s). The circuit 82 may implement a bias-T circuit. The circuit 84 may implement a diplexer. The circuit 86 may implement an intermediate frequency. The circuit 88 may implement a synthesizer. The circuit 90 may implement a mixer. The circuit 92 may implement a buffer. The components 60 may comprise other circuitry (not shown). The number, type and/or arrangement of the circuitry of the components 60 may be varied according to the design criteria of a particular implementation.

The local power circuit(s) 80 may be configured to provide power to the frequency converter 44 (e.g., the components 60 and/or the apparatus 100). The local power circuit(s) 80 may receive the signal DC. The signal DC may be the direct current power provided by the prime DC power 52 communicated by the customer device 42 as part of the signal INTF.

The bias-T circuit 82 may be configured to receive the interface signal INTF (e.g., from the customer device 42). The bias-T circuit 82 may be configured to generate the signal DC, the signal IF and the signal REF in response to the signal INTF. For example, the bias-T circuit 82 may pass the high frequency signal IF and the high frequency signal REF to the diplexer 84 and pass the DC bias to the local power circuit(s) 80.

The diplexer 84 may be configured to receive the intermediate frequency signal IF and the reference signal REF from the bias-T circuit 82. The diplexer 84 may separate the combined signals IF and REF. The diplexer 84 may provide the reference signal REF to the apparatus 100. The diplexer 84 may provide the intermediate frequency signal IF to the intermediate frequency block 86 and/or the mixer 90. In an example, the intermediate frequency block 86 may represent any of the circuitry and/or logic in the frequency converter 44 that utilizes the intermediate frequency 86.

The synthesizer 88 may be configured to generate frequencies in response to the local standard frequency. The synthesizer 88 may receive the signal LFS from the apparatus 100. For example, the synthesizer 88 may use the signal LFS as a reference frequency input. The synthesizer 88 may provide the frequencies to the mixer 90. A stability and/or accuracy of the frequencies generated by the synthesizer 88 may be a result of the stability and/or accuracy of the signal LFS. The stability and/or accuracy of the signal LFS may be controlled by the apparatus 100.

The mixer 90 may be configured to receive the frequency from the intermediate frequency IF and the frequency generated from the local frequency standard LFS. The mixer 90 may generate an output frequency from one input with the intermediate frequency signal IF and one input with the local frequency standard signal LFS. The output frequency generated by the mixer 90 may be provided to the buffer 92. The buffer 92 may generate the signal OUT. The buffer 92 may receive the mixed frequency from the mixer 90. The signal OUT may be generated in response to the intermediate frequency IF and the local frequency standard LFS. Since the local frequency standard signal LFS may not have the noise and/or distortion from the reference signal REF and may be synchronized to the reference signal REF, the signal OUT may not have the amplified version of the noise and/or distortion.

The components 60 may implement the functionality of the frequency converter 44 without the apparatus 100 (e.g., the reference signal REF may be provided directly to the synthesizer 88). However, within a tracking bandwidth of the synthesizer 88, the synthesizer 88 may be extremely sensitive to noise and/or distortion. For example, if the reference signal REF is provided directly to the synthesizer 88, any noise and/or distortion on the signal REF may result in undesired content on the output signal OUT. In an example, the tracking bandwidth of the synthesizer 88 may be set to minimize phase noise at the output of the synthesizer 88. Generally (e.g., in many low-cost implementations) the bandwidth of the synthesizer 88 may be wide enough to capture many sources of noise and/or distortion that corrupt the reference signal REF. If the synthesizer 88 captures noise and/or distortion from the reference signal REF, the result may be terrible noise on the upconverted signal OUT (e.g., enough noise that may even prevent the system 40 from functioning all together). By implementing the apparatus 100, the local frequency standard LFS may be used to ensure that noise and/or distortion from the signal REF is not passed to the synthesizer 88, while ensuring synchronization with the reference signal REF.

Implementing the apparatus 100 may provide the synthesizer 88 with the local frequency standard signal LFS. Adding an internal frequency standard using the signal LFS to the synthesizer 88 of the frequency converter 44 may reduce and/or eliminate corruption of the output signal OUT that would result from a noisy and/or distorted reference signal REF. The apparatus 100 may be further configured to synchronize the frequency of the local frequency standard signal LFS with the reference signal REF. In an example, without synchronization an internal frequency standard may drift from the reference signal REF. Synchronizing the local frequency standard signal LFS to the reference signal REF may prevent an accuracy of the internal frequency standard signal LFS from drifting. If a local frequency standard is not synchronized with the reference signal REF, undesirable frequency errors may be introduced to the output signal OUT. In an example, the drift (desynchronization) may be caused by an aging of the internal standard over time, and/or changes over temperature.

The apparatus 100 may reduce and/or eliminate noise and/or disturbances and ensure synchronization with the reference signal REF. The apparatus 100 may comprise the tracking circuit 102 and/or the frequency standard circuit 104. The tracking circuit 104 may be configured to receive the external reference signal REF and/or a signal (e.g., FB). The tracking circuit 102 may generate a signal (e.g., TUN). The frequency standard circuit 104 may be configured to receive the signal TUN. The frequency standard circuit 104 may be configured to generate the signal LFS and/or the signal FB. The apparatus 100 may comprise other components, generate additional signals and/or receive additional signals (not shown). The number, type, and/or arrangement of the components and/or signals of the apparatus 100 may be varied according to the design criteria of a particular implementation.

The tracking circuit 102 may implement a very low-bandwidth tracking circuit configured to align the internal standard signal LFS with the externally applied reference signal REF. The bandwidth of the tracking circuit 102 may be implemented to be sufficiently low to avoid noise and/or distortion that may be carried by the external reference signal REF. The signal TUN may be generated to tune (or train) the local frequency standard circuit 104. The tracking circuit 102 may be configured to generate the signal TUN in response to the external reference signal REF and the feedback signal FB from the tunable frequency standard circuit 104.

The reduction and/or elimination of the noise on the reference signal REF by the apparatus 100 may reduce constraints (e.g., design considerations that may increase cost) on the design of the customer device 42. Generally, the customer device 42 may be implemented to provide a low-noise frequency standard and to preserve the frequency standard from distortion. Similarly, by implementing the apparatus 100, the components 60 of the frequency converter 44 may have reduced constraints on preventing distortion of the incoming reference signal REF. Since the apparatus 100 reduces and/or eliminates the distortion and/or noise using the local frequency standard LFS, the components 60 and/or the customer device 42 may not have to be designed to reduce noise and/or distortion of the reference signal REF. For example, the cost of the customer device 42 and/or the frequency converter 44 may be reduced by implementing the apparatus 100. The apparatus 100 may reduce and/or eliminate the unwanted noise and/or distortion of the reference signal REF by tuning the internal frequency standard signal LFS using the tracking circuit 102. The tracking circuit 104 may be implemented with a bandwidth that may be low enough to prevent noise and/or distortion on the externally supplied reference REF from corrupting the output signal OUT.

Figure 4:
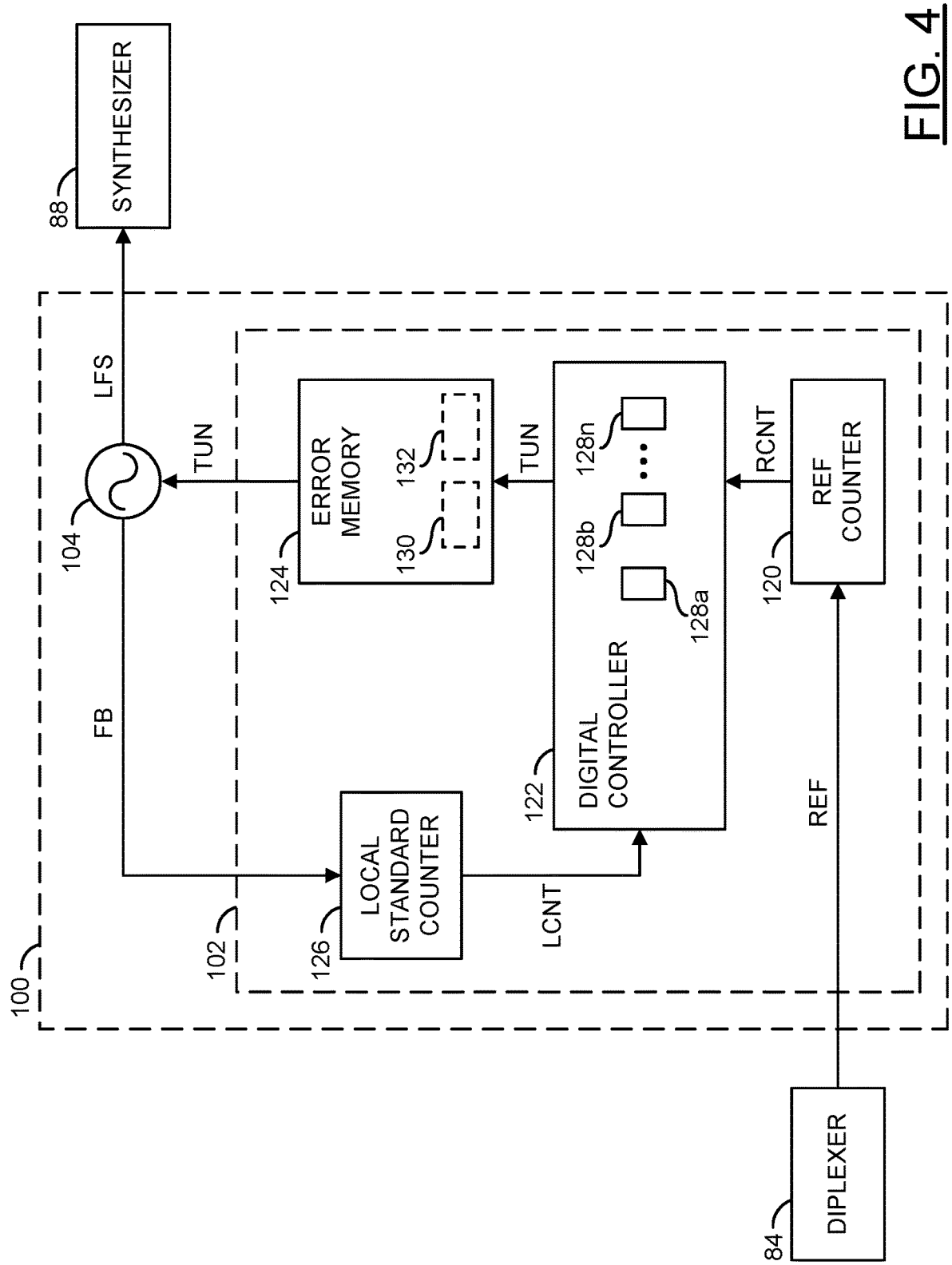
FIG. 4 is a block diagram illustrating an example embodiment of a tracking circuit with error memory.

Referring to FIG. 4, a block diagram illustrating an example embodiment of a tracking circuit with error memory is shown. A portion of the frequency converter 44 comprising the apparatus 100 is shown. The tracking circuit 102 and the frequency standard circuit 104 are shown implemented in the apparatus 100. The diplexer 84 is shown communicating the signal REF to the tracking circuit 102. The synthesizer 88 is shown receiving the signal LFS from the frequency standard circuit 104.

In some embodiments, the tracking circuit 102 may implement a digital tracking system. The tracking circuit 102 may comprise a block (or circuit) 120, a block (or circuit) 122, a block (or circuit) 124, a block (or circuit) 126 and/or a number of blocks (or circuits) 128a-128n. The circuit 120 may implement a reference counter. The circuit 122 may implement a digital controller. The circuit 124 may implement an error memory. The circuit 126 may implement a local standard counter. The circuits 128a-128n may each implement an integrator circuit. The tracking circuit 102 may comprise additional components and/or connections (not shown). The number, type and/or arrangement of the components of the tracking circuit 102 may be varied according to the design criteria of a particular implementation.

The reference counter 120 may be configured to monitor the reference signal REF. The reference counter 120 may receive the reference signal REF from the diplexer 84. The reference counter 120 may perform a count of the reference signal REF. In one example, the reference counter 120 may increase a count value in response to detecting a falling edge of the reference signal REF. In another example, the reference counter 120 may increase a count value in response to detecting a rising edge of the reference signal REF. The implementation of the reference counter 120 may be varied according to the design criteria of a particular implementation. The reference counter 120 may generate a signal (e.g., RCNT). The signal RCNT may comprise the count value for the reference signal REF.

The digital controller 122 may be configured to receive the signal RCNT and a signal (e.g., LCNT). The digital controller 122 may be configured to tune and/or train the frequency standard circuit 104. The digital controller 122 may be configured to align the internal standard signal LFS to the external reference frequency REF. The digital controller 122 may be configured to compare count values from the reference signal REF (e.g., provided by the signal RCNT) and the internal standard LFS (e.g., provided by the signal LCNT). The digital controller 122 may generate a signal (e.g., TUN). The signal TUN may be generated to adjust the internal standard LFS such that the count value of the internal standard signal LFS matches and/or is aligned with the count value of the external reference signal REF.

The digital controller 122 may generate the signal TUN to tune the internal standard signal LFS. The signal TUN may be generated to be rate adaptive. In one example, the rate adaptive implementation used by the digital controller 122 may result in faster error signal updates in the signal TUN in response to greater differences in frequency between the signal REF (e.g., the count value RCNT) and the local standard LFS (e.g., the count value LCNT). In another example, the rate adaptive implementation used by the digital controller 122 may result in slower error updates in the signal TUN in response to smaller differences in frequency between the signal REF (e.g., the count value RCNT) and the local standard LFS (e.g., the count value LCNT). The digital controller 122 may be configured to bind the update rate (thus adaptive) of the signal TUN to maintain noise performance yet retain faster tracking times.

The error memory 124 may be configured to provide storage. The error memory 124 may receive the signal TUN from the digital controller 122. The error memory 124 may be configured to store the tuning value in the signal TUN. The error memory 124 may present the signal TUN to the frequency standard circuit 104.

The error memory 124 may be configured to preserve the frequency for the local standard frequency signal LFS. The stored value of the signal TUN may be used even in the absence of the external reference signal REF. The error memory 124 may be configured to maintain a previous (e.g., last) setting that was found by the digital controller 122 to align the internal standard frequency signal LFS to the external reference signal REF. For example, when the reference signal REF is unavailable, the error memory 124 may provide the previously stored values of the signal TUN to the frequency standard circuit 104.

The frequency standard circuit 104 may be configured to receive the signal TUN. The frequency standard circuit 104 may be configured to generate the frequency standard signal LFS and the feedback signal FB. The signal LFS may be presented to the synthesizer 88. The signal FB may be presented to the local standard counter 126 as feedback.

In some embodiments, the frequency standard circuit 104 may be implemented as an internal frequency standard configured to generate the signal LFS used to derive a local oscillator frequency. In some embodiments, the frequency standard circuit 104 may be implemented as a high-purity local oscillator. In an example, the high-purity local oscillator may be a dielectric resonator oscillator (DRO). The frequency standard circuit 104 may be synchronized to an external standard (e.g., the signal REF) in response to the tuning signal TUN. The frequency standard circuit 104 may provide the feedback signal FB to enable the digital controller 122 to compare the local standard frequency LFS to the frequency of the reference signal REF.

The local standard counter 126 may be configured to monitor the local standard frequency signal LFS. The local standard counter 126 may monitor the local standard frequency from the feedback signal FB received from the frequency standard circuit 104. For example, the feedback signal FB may be the same or have the same characteristics as the local frequency signal LFS. The local standard counter 126 may perform a count of the feedback signal FB. In one example, the local standard counter 126 may increase a count value in response to detecting a falling edge of the reference signal FB. In another example, the local standard counter 126 may increase a count value in response to detecting a rising edge of the reference signal FB. The implementation of the local standard counter 126 may be varied according to the design criteria of a particular implementation. The local standard counter 126 may generate the signal LCNT. The signal LCNT may comprise the count value for the local standard frequency signal LFS.

One or more of the integrator circuits 128a-128n may be implemented within the digital controller 122. For example, at least one integrator circuit 128a may be implemented in the error path of the tracking circuit 102. Implementing at least one of the integrator circuits 128a-128n may ensure that the tracking circuit 102 drives a steady-state error to zero in response to a sudden change in the input (e.g., a step input on the reference signal REF). Implementing at least two of the integrator circuits (e.g., 128a-128b) may enable the tracking circuit 102 to drive the steady-state error to zero in response to either a step or a ramp input on the reference signal REF.

The error memory 124 may comprise a block (or circuit) 130 and/or a block (or circuit) 132. The circuit 130 may comprise a volatile memory. The circuit 132 may comprise a non-volatile memory. The error memory 124 may comprise other components (not shown). In some embodiments, the volatile memory 130 and the non-volatile memory 132 may be implemented as separate components. For example, the volatile memory 130 may be implemented as a separate circuit and a sub-section of the volatile memory 130 may be the error memory 124 and the non-volatile memory 132 may be implemented as a separate circuit and a sub-section of the non-volatile memory 132 may be the error memory 124. The arrangement, size and/or hierarchy of the error memory 124, the volatile memory 130 and/or the non-volatile memory 132 may be varied according to the design criteria of a particular implementation.

The volatile memory 130 may be configured to store the tuning signal TUN. The volatile memory 130 may be a memory that enables fast storage access to data (a higher read/write speed than the non-volatile memory 132). In an example, the volatile memory 130 may be a random access memory (RAM). Data stored in the volatile memory 130 may not be available when power to the apparatus 100 and/or the frequency converter 44 is unavailable (e.g., the stored data is not retained without a continuous source of power). Generally, the digital controller 122 may write the value of the tuning signal TUN to the volatile memory 130 to enable the error memory 124 to store the last good value of the tuning signal TUN used to generate the internal standard frequency signal LFS.

The non-volatile memory 132 may be configured to store the tuning signal TUN. The non-volatile memory 132 may be a memory that enables reliable, long-term data storage. In an example, the non-volatile memory 132 may be a flash memory. Data stored in the non-volatile memory 132 may be available even when power to the apparatus 100 and/or the frequency converter 44 is unavailable (e.g., the stored data is retained even when a power supply is unavailable). When power to the apparatus 100 and/or the frequency converter 44 becomes available again, the data stored in the non-volatile memory 132 may be available again. Generally, the digital controller 122 may write the value of the tuning signal TUN to the non-volatile memory 132 to enable the error memory 124 to store the last good value of the tuning signal TUN used to generate the internal standard frequency signal LFS.

The digital controller 122 may write the tuning signal TUN to the non-volatile memory 132 less often than to the volatile memory 130. For example, since the volatile memory 130 provides faster data access than the non-volatile memory 132, the performance of the apparatus 100 may be faster and/or more efficient when writing more often to the volatile memory 130 than the non-volatile memory 132. In an example, if power is available, and the reference signal REF becomes unavailable, then the previous value of the internal frequency standard stored in the volatile memory 130 may be provided by the error memory 124 to the frequency standard circuit 104.

When the apparatus 100 and/or the frequency converter 44 is powered on, the volatile memory 130 may not store data (e.g., the data stored may not be retained without power). To enable the apparatus 100 to quickly provide the local standard frequency signal LFS, the error memory 124 may provide the tuning signal TUN without performing any training using the reference signal REF. The previous value stored in the non-volatile memory 132 may be provided by the error memory 124 to the frequency standard circuit 104. Providing the previous value stored in the non-volatile memory 132 may enable the apparatus 100 to provide the local standard frequency signal LFS faster than waiting for the apparatus 100 to determine the tuning signal TUN in response to the reference signal REF. The previous value stored for the tuning signal TUN in the non-volatile memory 132 may be used until the digital controller 122 generates an updated version of the tuning signal TUN in response to the reference signal REF (e.g., training may be performed while the previously stored value of the tuning signal TUN is used).

Figure 5:
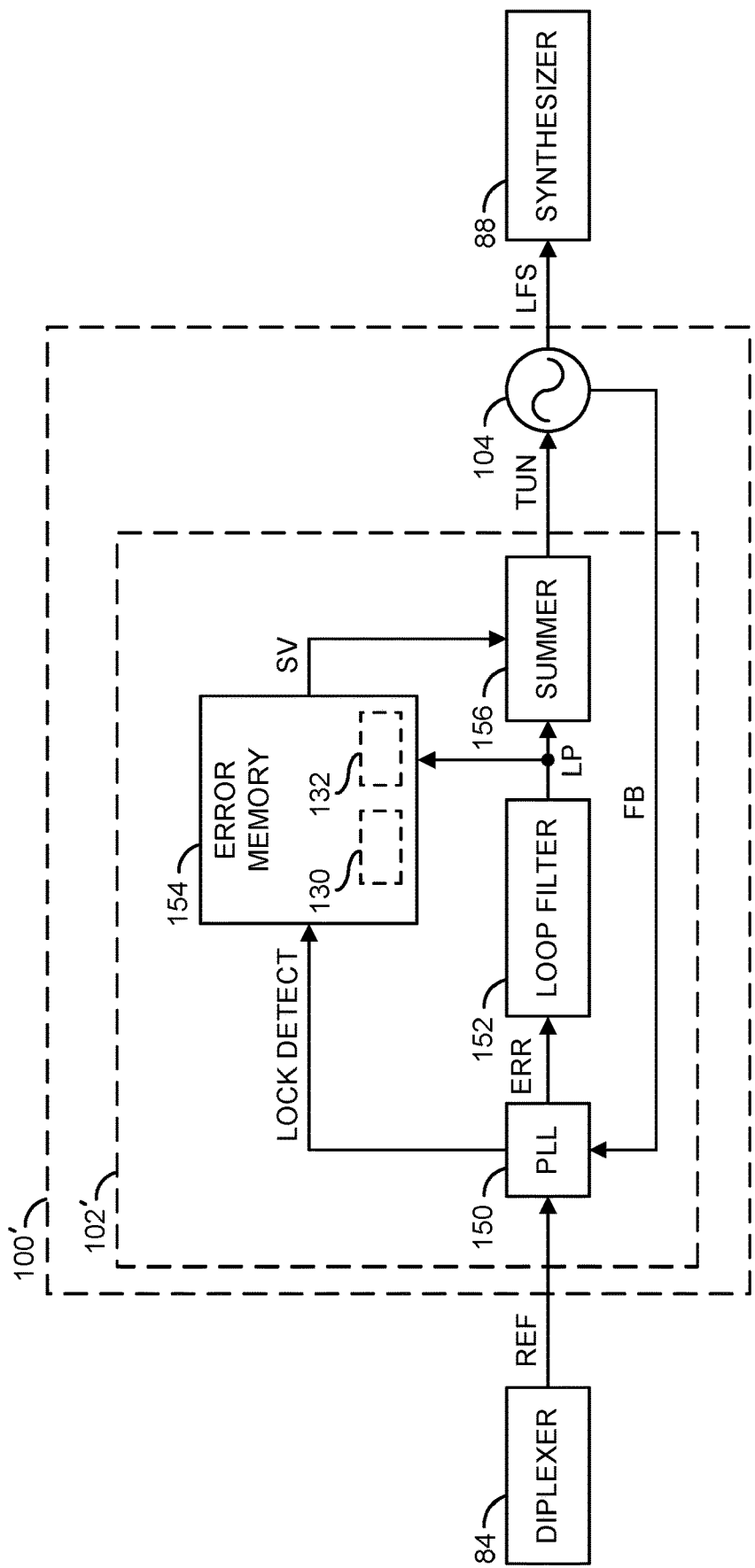
FIG. 5 is a block diagram illustrating a low-bandwidth tracking circuit using a phase-locked loop design.

Referring to FIG. 5, a block diagram illustrating a low-bandwidth tracking circuit using a phase-locked loop design is shown. A portion of the frequency converter 44 comprising the apparatus 100' is shown. The tracking circuit 102' and the frequency standard circuit 104 are shown implemented in the apparatus 100'. The diplexer 84 is shown communicating the signal REF to the tracking circuit 102'. The synthesizer 88 is shown receiving the signal LFS from the frequency standard circuit 104. In some embodiments, the phase-locked loop design of the apparatus 100' may be configured to implement a rate adaptive tracking loop.

In some embodiments, the tracking circuit 102' may implement a phased-locked loop system. The tracking circuit 102' may comprise a block (or circuit) 150, a block (or circuit) 152, a block (or circuit) 154 and/or a block (or circuit) 156. The circuit 150 may implement a phase-locked loop (PLL). The circuit 152 may implement a loop filter. The circuit 154 may implement an error memory. The circuit 156 may implement a summer circuit. The tracking circuit 102' may comprise additional components and/or connections (not shown). The number, type and/or arrangement of the components of the tracking circuit 102' may be varied according to the design criteria of a particular implementation.

The PLL circuit 150 may be configured to receive the signal REF and the signal FB. The signal REF may be received from the diplexer 84. The signal FB may be received from the frequency standard circuit 104. The circuit 150 may generate a signal (e.g., LOCK DETECT) and a signal (e.g., ERR). The signal LOCK DETECT may be presented to the error memory 154. The signal ERR may be presented to the loop filter 152.

The PLL circuit 150 may comprise a phase comparator. The phase comparator 150 may compare the phase of the reference signal REF to the phase of the feedback signal FB. The signal ERR may comprise an error signal of the difference between the signal REF and the signal FB. For example, the signal ERR may be proportional to the difference between the reference signal REF and the feedback signal FB from the local frequency standard circuit 104. The signal LOCK DETECT may be presented to the error memory 154 when the local frequency standard signal LFS is aligned (e.g., in-phase) with the reference signal REF. The PLL circuit 150 may comprise other components (e.g., a charge pump).

The loop filter 152 may be configured to receive the signal ERR. The loop filter 152 may be configured to generate a signal (e.g., LP). The signal LP may be presented to the error memory 154 and the summer circuit 156. The loop filter 152 may implement a low pass filter. A bandwidth of the loop filter 152 may be implemented to be sufficiently low to attenuate undesired content on the signal REF (e.g., noise, spurious content, etc.). The bandwidth of the loop filter 152 may be selected to ensure that signal content on the external reference signal REF beyond a few Hertz offset from the center frequency of the signal REF may be attenuated.

The error memory 154 may be configured to provide storage. The error memory 154 may receive the signal LOCK DETECT from the PLL circuit 150. The error memory 154 may be configured to receive the signal LP from the loop filter 152. The error memory 154 may present a signal (e.g., SV) to the to the summer circuit 156.

The error memory 154 may be configured to store values. The error memory 154 may be configured to preserve the frequency for the local standard frequency signal LFS. The signal SV may represent the preserved frequency. The stored value of the signal LOCK DETECT and/or the signal LP may be used even in the absence of the external reference signal REF. The error memory 154 may be configured to maintain a previous (e.g., last) setting that was found to be in phase by the PLL circuit 150 to align the internal standard frequency signal LFS to the external reference signal REF. The error memory 154 may be switchable so that the local frequency standard circuit 104 may continue to operate when the PLL circuit 150 loses a lock. When the PLL circuit 150 loses a lock, the local frequency standard circuit 104 may be held at the last frequency in alignment that was set by the PLL 150.

The error memory 154 may comprise the volatile memory 130 and/or the non-volatile memory 132. The volatile memory 130 and/or the non-volatile memory 132 implemented by the error memory 154 may have a similar functionality as implemented in the error memory 124 described in association with FIG. 4. In an example, the volatile memory 130 and the non-volatile memory 132 may store the signal LOCK DETECT and/or the signal LP. The volatile memory 130 may provide the signal LOCK DETECT and/or the signal LP as the signal SV when power is available to the apparatus 100' and the signal REF becomes unavailable. The non-volatile memory 132 may provide the signal LOCK DETECT and/or the signal LP as the signal SV when the apparatus 100' is powered on (e.g., until the training is performed in response to the signal REF).

The summer circuit 156 may be configured to receive the signal LP and the signal SV. The summer circuit 156 may be configured to combine the signal LP from the loop filter 152 and the signal SV from the error memory 154. The summer circuit 104 may generate the signal TUN in response to the signal SV and/or the signal LP. The signal TUN may be presented to local frequency standard circuit 104.

The local frequency standard circuit 104 may generate the signal LFS and the signal FB in response to the signal TUN. The local frequency standard circuit 104 may present the signal LFS to the synthesizer 88. The local frequency standard circuit 104 may present the signal FB to the PLL circuit 150.

Figure 6:
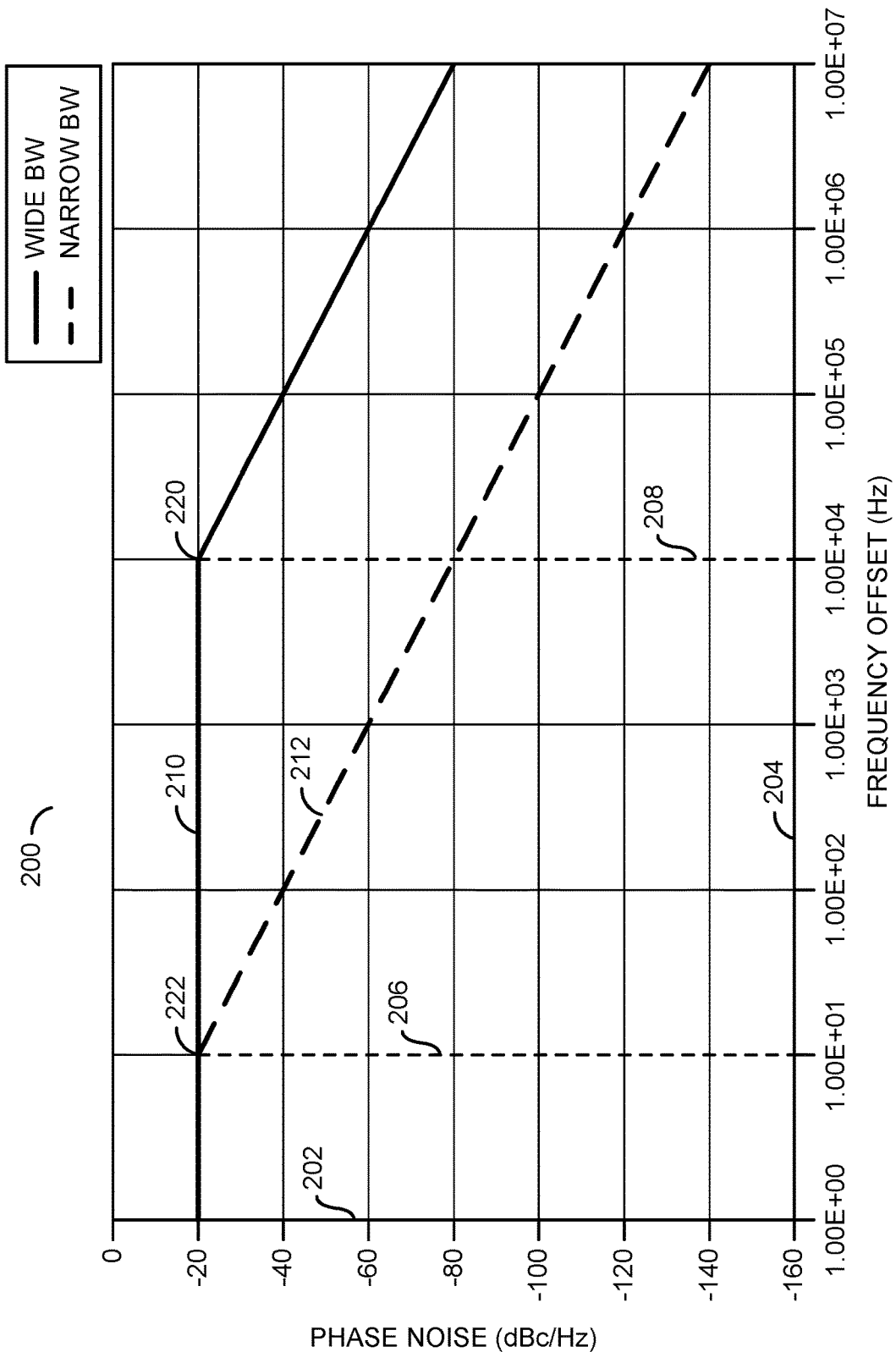
FIG. 6 is a diagram illustrating a graph of a typical phase noise response through a wide filter and a narrow filter for a tracking circuit.

Referring to FIG. 6, a diagram illustrating a graph of a typical phase noise response through a wide filter and a narrow filter for the tracking circuit 102 is shown. A graph 200 is shown. The graph 200 may comprise a vertical axis 202 and a horizontal axis 204. The vertical (or Y) axis 202 may represent a phase noise measured in dBc/Hz. The horizontal (or X) axis 204 may represent a frequency offset measured in Hz.

A vertical line 206 is shown. The vertical line 206 may correspond to a frequency offset of 10 Hz. A vertical line 208 is shown. The vertical line 208 may correspond to a frequency offset of 10 kHz. The bandwidth of the vertical line 206 and/or the bandwidth of the vertical line 208 may be shown for illustrative purposes. The phase noise value of the vertical line 206 and/or the vertical line 208 may be above or below the values shown. While the phase noise value of the vertical line 206 and/or the vertical line 208 are shown as generally straight lines, the actual values may deviate from a straight line. The value of the bandwidths may be varied according to the design criteria of a particular implementation.

A phase noise curve 210 and a phase noise curve 212 are shown. The phase noise curve 210 may represent a filter roll-off for a wide bandwidth filter. The phase noise curve 212 may represent a filter roll-off for a narrow bandwidth filter. The phase noise curve 210 and/or the phase noise curve 212 may each represent the low bandwidth of the tracking circuit 102.

At low frequencies, the wide bandwidth response 210 may be at approximately −20 dBc/Hz. A point 220 is shown on the wide bandwidth response 210. The point 220 may correspond with the 10 kHz frequency offset. The wide bandwidth response 210 may roll-off at (e.g., attenuate frequencies greater than) approximately 10 kHz.

At low frequencies, the narrow bandwidth response 212 may be at approximately −20 dBc/Hz. A point 222 is shown on the narrow bandwidth response 212. The point 222 may correspond with the 10 Hz frequency offset. The narrow bandwidth response 212 may roll-off at (e.g., attenuate frequencies greater than) approximately 10 Hz.

Generally, the narrow filter response 212 may be implemented by the tracking circuit 102 for blocking the unwanted noise coming in on the reference signal REF. Generally, the wide filter response 210 may be implemented by the tracking circuit 102 for quickly locking the internal frequency standard signal LFS to the reference signal REF. For example, a greater amount of frequencies on the reference signal REF may be blocked when the tracking circuit 102 uses the narrow filter response 212 compared to when the tracking circuit 102 uses the wide filter response 210. In another example, the local frequency standard LFS may be aligned to the reference signal REF faster when the tracking circuit 102 uses the wider filter response 210 compared to when the tracking circuit 102 uses the narrow filter response 212.

In the example shown, for the narrow filter response 212, unwanted signal content on the reference signal REF may pass up to 10 Hz. In the example shown, for the wide filter response 210 unwanted signals on the reference signal REF may pass up to 10 kHz (e.g., 1000 times wider than the narrow filter response 212).

Figure 7:
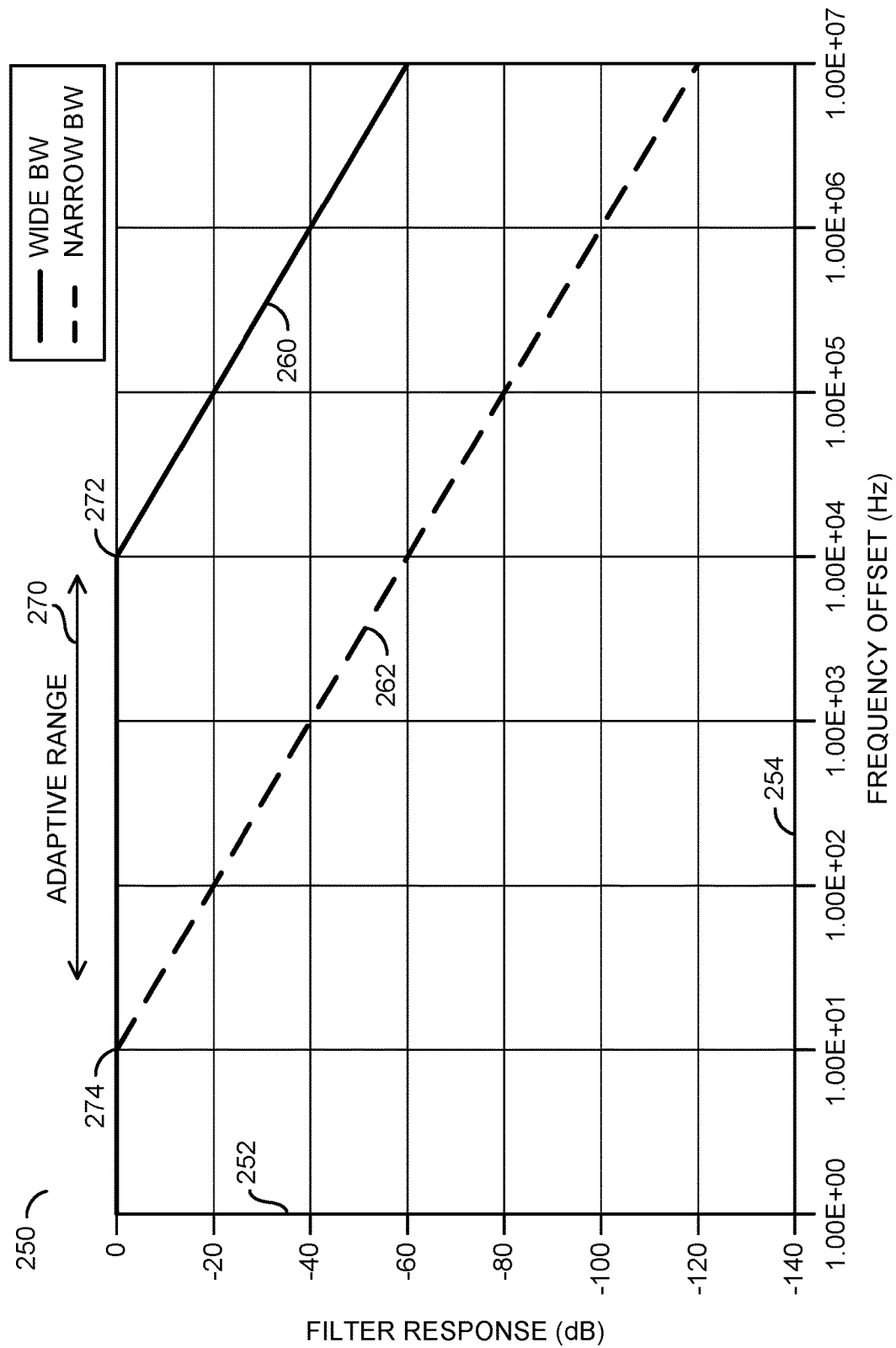
FIG. 7 is a diagram illustrating a graph of an adaptive filter for a tracking circuit.

Referring to FIG. 7, a diagram illustrating a graph of an adaptive filter for the tracking circuit 102 is shown. A graph 250 is shown. The graph 250 may comprise a vertical axis 252 and a horizontal axis 254. The vertical (or Y) axis 252 may represent a phase noise measured in dBc/Hz. The horizontal (or X) axis 254 may represent a frequency offset measured in Hz.

A filter response curve 260 and a filter response curve 262 are shown. The filter response curve 260 may represent a filter roll-off for the wide bandwidth filter. The filter response curve 262 may represent a filter roll-off for the narrow bandwidth filter. The filter response curve 260 and/or the filter response curve 262 may represent the low bandwidth of the tracking circuit 102. The filter response curve 260 and the filter response curve 262 may have a similar response as the phase noise curve 210 and the phase noise curve 212, respectively, as shown in association with FIG. 6.

A double-ended arrow 270 is shown. The double-ended arrow 270 may represent an adaptive rate range of the tracking circuit 102. The adaptive rate range 270 is shown between a point 272 on the wide bandwidth response 260 and a point 274 on the narrow bandwidth response 262. The point 272 may correspond with the 10 kHz frequency offset. The wide bandwidth response 260 may roll-off at (e.g., attenuate frequencies greater than) approximately 10 kHz. The point 274 may correspond with the 10 Hz frequency offset. The narrow bandwidth response 262 may roll-off at (e.g., attenuate frequencies greater than) approximately 10 Hz. The wide bandwidth response 260 and/or the narrow bandwidth response 262 shown may be for illustrative purposes. The filter response of the wide bandwidth response 260 and/or the narrow bandwidth response may be above or below the values shown. While the wide bandwidth response 260 and/or the narrow bandwidth response 262 are shown as generally a combination of straight lines, the actual values may deviate from the straight line. Similarly, the width of the adaptive range 270 may be larger or smaller than shown. The value of the bandwidths may be varied according to the design criteria of a particular implementation.

In the example shown, the tracking circuit 102 may have an adaptive rate range 270 of 10 Hz to 10 kHz. The adaptive rate range 270 may be a lower value at the low end (e.g., less than 10 Hz) or higher at the low end (e.g., greater than 10 Hz). The adaptive rate range 270 may be lower at the high end (e.g., less than 10 kHz) or higher at the high end (e.g., greater than 10 kHz). The adaptive rate range 270 of the tracking circuit 102 may be varied according to the design criteria of a particular implementation.

The adaptive rate range 270 may enable the tracking circuit 102 to change bandwidth dynamically. In an example, the tracking circuit 102 may operate at the wide bandwidth response 260 and then change to the narrow bandwidth response 262. The adaptive rate range 270 may be configured to operate at any bandwidth within the adaptive rate range 270 (e.g., the roll-off of the bandwidth response may be any value within the adaptive range 270). The rate adaptive feature implemented by the tracking circuit 102 may be used to quickly acquire a lock to the external reference signal REF using the wide bandwidth response 260, but then still block unwanted noise by switching to the narrow bandwidth response 262. The bandwidth of the tracking circuit 102 may be dynamically set up to quickly track the reference signal REF but then change to lock out noise carried by the reference signal REF.

Figure 8:
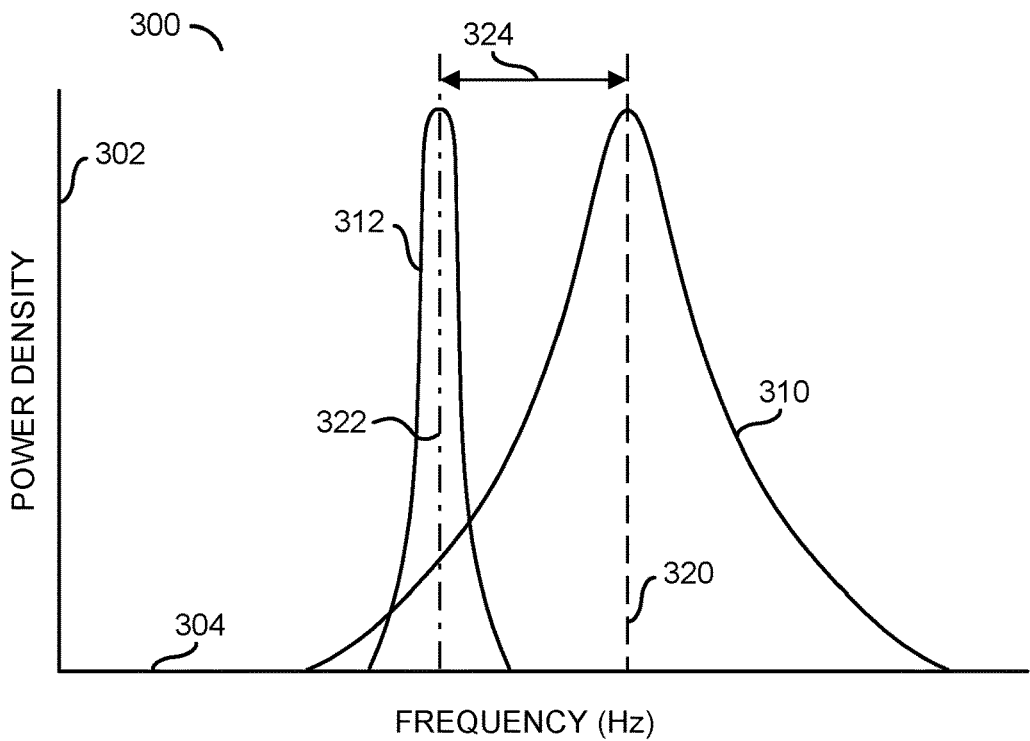
FIG. 8 is a diagram illustrating a graph of a local low-noise reference signal out of synchronization with a noisy reference signal.

Referring to FIG. 8, a diagram illustrating a graph of a local low-noise reference signal out of synchronization with a noisy reference signal is shown. A graph 300 is shown. The graph 300 may comprise a vertical axis 302 and a horizontal axis 304. The vertical (or Y) axis 302 may represent a power density. The horizontal (or X) axis 304 may represent a frequency measured in Hz.

An oscillator spectrum 310 and an oscillator spectrum 312 are shown. The oscillator spectrum 310 may be a remote, noisy reference signal. The oscillator spectrum 312 may be a local, low-noise reference. The oscillator spectrum 310 may represent an example of the reference signal REF. The oscillator spectrum 312 may represent an example of the internal frequency standard LFS. In the example shown, the REF oscillator spectrum 310 and the LFS oscillator spectrum 312 may have a relatively equal power density.

A vertical line 320 and a vertical line 324 are shown. The vertical line 320 may represent a center frequency of the REF oscillator spectrum 310. The vertical line 322 may represent a center frequency of the LFS oscillator spectrum 322. In the example shown, the REF oscillator spectrum 310 may be noisy (e.g., comprise many frequencies offset from the center frequency 320). Generally, the REF oscillator spectrum 310 may be stable (e.g., consistently at the REF center frequency 320). In the example shown, the LFS oscillator spectrum 312 may have low noise (e.g., comprise few frequencies offset from the LFS center frequency 322). Generally, the LFS oscillator spectrum 312 may have low noise but may drift from the reference signal REF over time.

In the example shown, the LFS center frequency 322 of the LFS oscillator spectrum 312 may be at a lower frequency value than the REF center frequency 320 of the REF oscillator spectrum 310. A double-ended arrow 324 is shown. The double-ended arrow 324 may represent a drift between the LFS oscillator spectrum 312 and the REF oscillator spectrum 310. One end of the drift 324 may be at the REF center frequency 320 and another end of the drift 324 may be at the LFS center frequency 322. When there is the drift 324 (e.g., a difference between the REF center frequency 320 and the LFS center frequency 322), then the LFS oscillator spectrum 312 may be out of synchronization with the REF oscillator spectrum 310. The apparatus 100 may be configured to synchronize LFS oscillator spectrum 312 with the REF oscillator spectrum 310.

Figure 9:
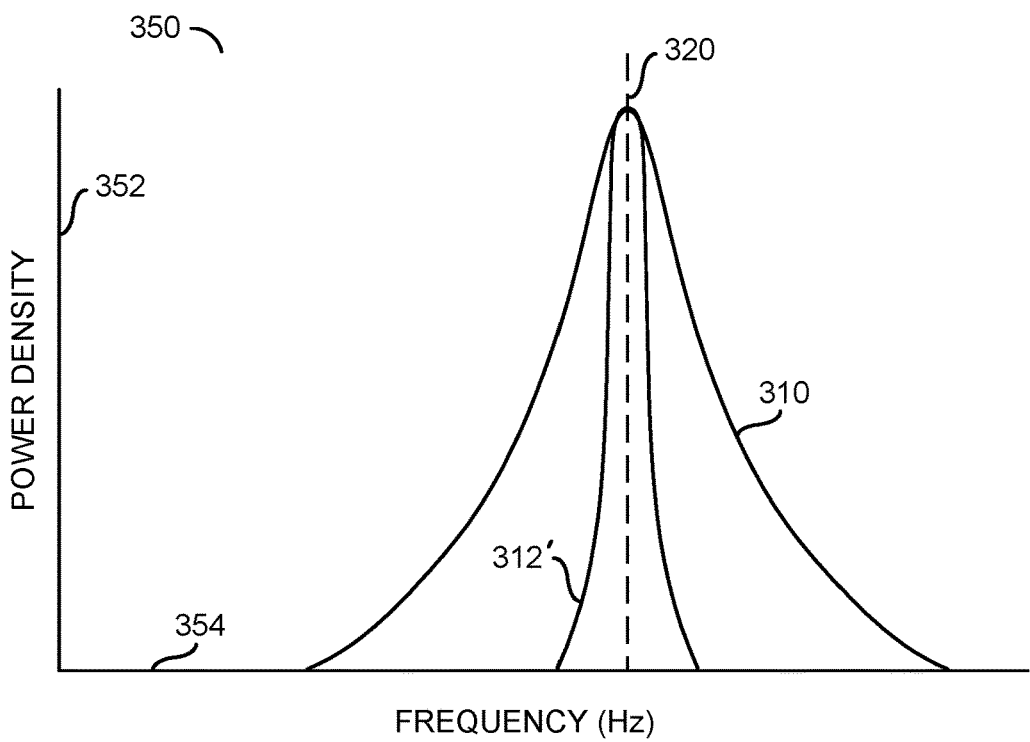
FIG. 9 is a diagram illustrating a graph of a local low-noise reference signal in synchronization with a noisy reference signal.

Referring to FIG. 9, a diagram illustrating a graph of a local low-noise reference signal in synchronization with a noisy reference signal is shown. A graph 350 is shown. The graph 350 may comprise a vertical axis 352 and a horizontal axis 354. The vertical (or Y) axis 352 may represent a power density. The horizontal (or X) axis 354 may represent a frequency measured in Hz.

The oscillator spectrum 310 and the oscillator spectrum 312' are shown on the graph 350. The REF center frequency 320 is shown. In the example shown, the REF oscillator spectrum 310 and the LFS oscillator spectrum 312' may have a relatively equal power density.

The tracking circuit 102 may be configured to synchronize the LFS oscillator spectrum 312' with the REF oscillator spectrum 320. In the graph 350, the LFS oscillator spectrum 312' may be shown in synchronization with the REF oscillator spectrum 310. The REF oscillator spectrum 310 is shown as a noisy signal stable at the REF center frequency 320. The synchronized LFS oscillator spectrum 312' may be shown as a low-noise signal at the REF center frequency 320. When the tracking circuit 102 synchronizes the LFS oscillator spectrum 312' with the REF oscillator spectrum 310, both the synchronized LFS oscillator spectrum 312' and the REF oscillator spectrum 310 may be at the REF center frequency 320 (e.g., the drift 324 shown in association with FIG. 8 may be zero).

The signal LFS may have a tendency to drift over time. As the signal LFS drifts, the tracking circuit 102 may be configured to maintain synchronization to the reference signal REF. The low bandwidth of the tracking circuit 102 may prevent noise on the reference signal REF from corrupting the local frequency standard LFS. In the example shown, the synchronized LFS oscillator spectrum 312' may have a low noise compared to the reference oscillator spectrum 310 (e.g., the synchronized LFS oscillator spectrum 312' may comprise fewer frequencies offset from the REF center frequency 320).

The adaptive rate implemented by the tracking circuit 102 may be configured to maintain the synchronization of the LFS oscillator spectrum 312' to the REF oscillator spectrum 310. The adaptive rate may enable the synchronization to be maintained through fast transients (e.g., by using the wide bandwidth response) as well as signal drift. In an example, the digital controller 122 may compare the signal RCNT from the reference counter 120 to the signal LCNT from the local standard counter 126. When there is a large difference between the count value RCNT and the count value LCNT, the digital controller may generate the signal TUN based on a wide bandwidth to enable quickly tracking the reference signal REF (e.g., to align the LFS oscillator spectrum 312 to the REF center frequency 320). The digital controller 122 may be configured to adjust the adaptive rate within the adaptive range 270 based on an amount of difference between the count value RCNT and the count value LCNT (as shown in association with FIG. 4). Similarly, the PLL circuit 150 may be configured to adjust the adaptive rate within the adaptive range 270 using the signal ERR based on the difference between the signal REF and the signal FB (as shown in association with FIG. 5).

The tracking circuit 102 may ensure that noise content on the REF oscillator spectrum 310 beyond a few Hz offset from the REF center frequency 320 gets attenuated. The sensitivity of the LFS oscillator spectrum 312' to unwanted content may be a function of the tracking bandwidth used by the tracking circuit 102.

The apparatus 100 may be implemented as part of the frequency converter 44. The apparatus 100 may be implemented in the transmit and receive system 40 that incorporates one or more frequency converters. In an example, the system 40 may be a satellite system that uses the reference signal REF as a clock signal. The tracking circuit 102 may use a bandwidth tracking that has a lower bandwidth than the reference signal REF to figure out what the frequency of the reference signal REF is and then use the signal TUN to generate a completely new clock (e.g., the local frequency standard LFS). The tracking circuit 102 may be configured to train (e.g., adjust) the local tunable oscillator 104 based on the signal REF. In some embodiments, the tracking circuit 102 may be configured as a digital tracking circuit. In some embodiments, the tracking circuit 102 may be configured as an analog tracking circuit.

The signal REF may get corrupted (e.g., especially if a customer uses the signal REF to upconvert). The apparatus 100 may be configured to generate a completely new clean oscillator signal LFS inside the frequency converter 44. In an example, if the signal REF is a 10 MHz signal, then an example bandwidth for the low bandwidth tracking circuit 102 may be approximately 1 Hz or less.

The apparatus 100 may be configured to adapt the rate of the tracking circuit 102. Generally, the rate adaptive bandwidth may be adjusted based on how long tracking the signal REF would take and/or the amount of difference between the signal LFS and the signal REF. In an example, for a large error (e.g., the difference 324 is large) the tracking may be accelerated (e.g., sped up) by the tracking circuit 102 using the wider bandwidth response 260 to enable a faster correction (e.g., while still providing an attenuation of the unwanted content). If there is not much of an error (e.g., the difference 324 is small), then the slower tracking using the narrow bandwidth response 262 may be used (e.g., slower synchronization but more noise may be blocked). In one example, when the tracking circuit 102 uses a 1 Hz tracking the synchronization may take approximately 50 pulses (e.g., about 1 minute). If approximately 1 minute is too long for synchronization, the adaptive tracking of the tracking circuit 102 may increase the bandwidth to 10 Hz, which may reach the 50 pulses for synchronization within about 1 second.

The local internal oscillator 104 may drift over time. The tracking circuit 102 may be configured to tune and/or retrain the oscillator circuit 104 occasionally. The amount of time between tuning the oscillator 104 may be varied. In some examples, training once a month might be sufficient. For long periods of time without retraining, relying on the previously stored values in the error memory 124 (or the error memory 154) may be used to continue generating the signal LFS.

The apparatus 100 may be implemented within the frequency converter 44 to generate the internal frequency standard signal LFS. The signal LFS may be used by the frequency converter 44 to derive the signal OUT. The apparatus 100 may be implemented as part of a high-power frequency converter used in satellite communication systems. The type of system(s) implementing the apparatus 100 may be varied according to the design criteria of a particular implementation.

In some embodiments, the tracking circuit 102 may synchronize the internal frequency standard LFS to the externally supplied reference signal REF using a digital tracking system with counters (e.g., the reference counter 120 and the local standard counter 126). The error signal memory 124 may be implemented to enable the frequency converter 44 to continue to operate in the absence of an externally applied reference signal REF (e.g., the signal LFS may be generated based on a previously stored value derived from the reference signal REF measured at an earlier time). The tracking circuit 102 may comprise a rate adaptive tracking loop. The tracking circuit 102 may comprise one or more of the integrators 128a-128n in the error path (e.g., within the digital controller 122).

In some embodiments, the tracking circuit 102' may comprise the phase-locked loop 150. The tracking circuit 102' may comprise the switchable error memory 154 to enable the local frequency standard LFS to continue to operate at the last frequency set by the PLL 150 (e.g., to be used in the event that the external reference signal REF becomes unavailable).

The tracking circuit 102 may be configured to reduce and/or prevent noise and distortion carried by the external reference signal REF. Reducing and/or preventing noise and distortion may enable the signal LFS to be generated without corruption from the noise and/or distortion on the reference signal REF. In one example, the tracking circuit 102 may reduce noise and/or distortion using frequency counters and long counting periods. In another example, the tracking circuit 102 may comprise a rate adaptive tracking loop with rate bounds (e.g., the adaptive range 270). The adaptive range 270 may be set according to system level parameters determined based on lock time and/or noise performance. In another example, the noise and/or distortion may be prevented using the low bandwidth loop filter 152 on the PLL tracking circuit 102'.

The apparatus 100 may be configured to operate with the bias-T circuit 82 to separate prime power from the external reference signal REF and the input intermediate signal IF. In an example, high-power amplifiers using nonlinear bias (e.g., other than class A) while drawing prime power through the bias-T 82 from the same line that carries the frequency reference signal REF may cause bias currents to surge with the input signal IF. The surge of the bias currents may add distortion to the external reference signal REF. The tracking circuit 102 may be configured to filter out the distortion caused by the bias currents.

In some embodiments, the apparatus 100 may operate in the frequency converter 44 without an internal frequency standard. In an example, the circuit 104 may comprise a high-purity local oscillator that may be synchronized to the external standard reference signal REF. The circuit 104 may be tunable using the tracking circuit 102.

Figure 10:
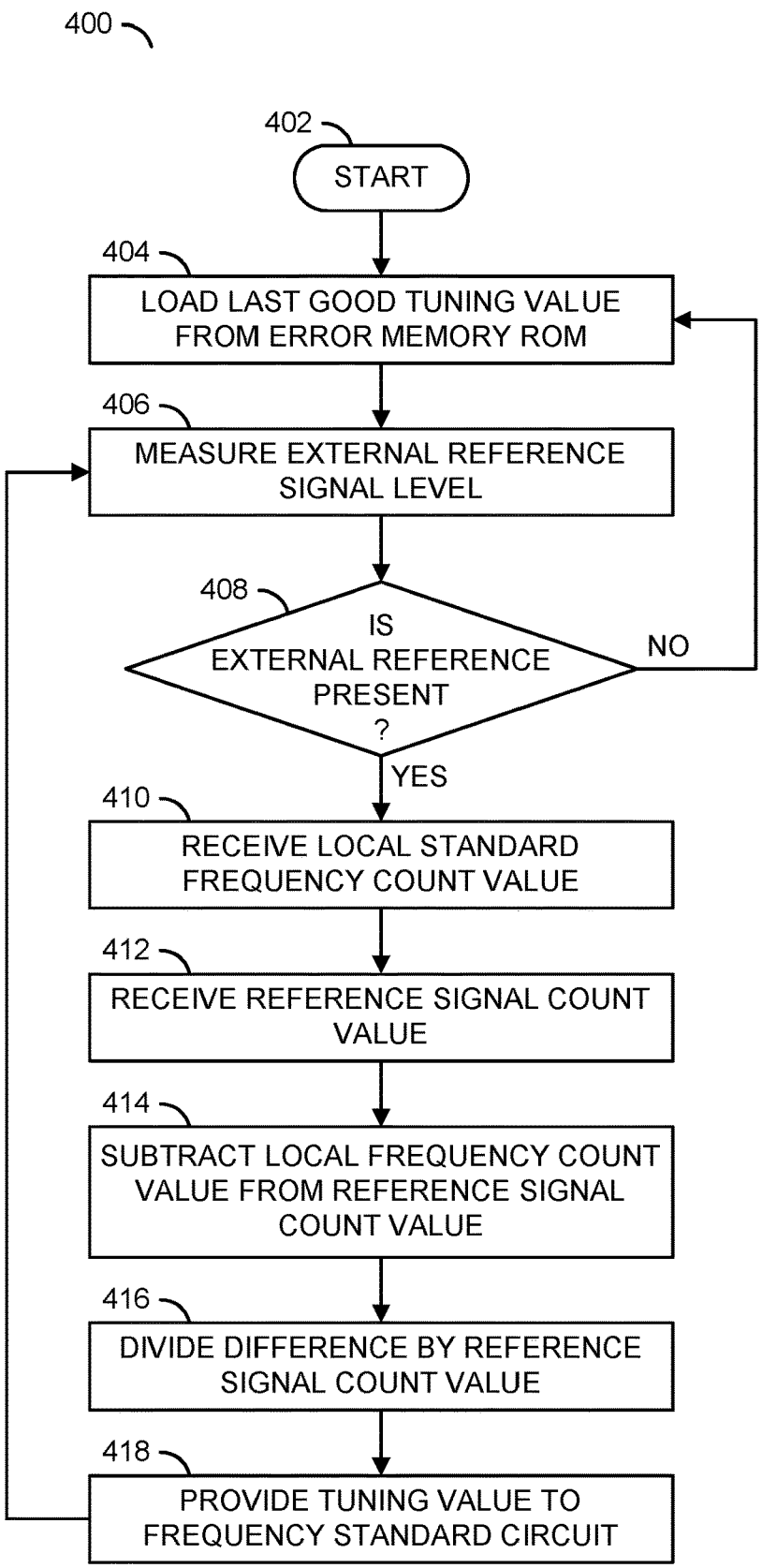
FIG. 10 is a flow diagram illustrating a method for generating a digital signal in response to a reference signal.

Referring to FIG. 10, a method (or process) 400 is shown. The method 400 may generate a digital signal in response to a reference signal. The method 400 generally comprises a step (or state) 402, a step (or state) 404, a step (or state) 406, a decision step (or state) 408, a step (or state) 410, a step (or state) 412, a step (or state) 414, a step (or state) 416, and a step (or state) 418.

The step 402 may start the method 400. In the step 404, the digital controller 122 may provide an instruction to the error memory 124 to load the last good tuning value (e.g., the stored value of the tuning signal TUN) from the error memory 124. In an example, the apparatus 100 may be powered on and the tuning signal TUN may be read from the non-volatile memory 132 (e.g., the memory ROM). The stored tuning value signal TUN may be provided to the frequency standard circuit 104. In the step 406, the digital controller 122 may measure a signal level of the external reference signal REF. In one example, the reference counter circuit 120 may generate the signal RCNT in response to the reference signal REF. Next, the method 400 may move to the decision step 408.

In the decision step 408, the digital controller 122 may determine whether the external reference signal REF is present. In one example, if the signal RCNT is a zero value, then the reference signal REF may not be present. If the reference signal REF is not present, then the method 400 may return to the step 402. If the external reference signal REF is present, then the method 400 may move to the step 410. In the step 410, the digital controller 122 may receive the local standard frequency count value. In an example, the digital controller 122 may read the local standard frequency count value from the signal LCNT provided by the local standard counter 126. Next, in the step 412, the digital controller 122 may receive the reference signal count value (e.g., read the count value in the signal RCNT). Next, the method 400 may move to the step 414.

In the step 414, the digital controller 122 may subtract the local frequency count value from the reference frequency signal count value. In an example, the digital controller 122 may read the count values from the signal LCNT and the signal RCNT and perform a subtraction operation. Next, in the step 416, the digital controller 122 may divide the difference by the reference signal count value RCNT. In the step 418, the digital controller 122 may provide the tuning value signal TUN to the frequency standard circuit 104. In an example, the tuning value may be determined by performing an equation (EQ1): (RCNT−LCNT)/RCNT. The tuning value signal TUN may be provided to the error memory 124 for storage and to the frequency standard circuit 104. Next, the method 400 may return to the step 406.

Generally, the apparatus 100 may be configured to provide the stored value of the tuning signal TUN to the local frequency standard circuit 104, while the digital controller 122 performs the steps 406-418. Providing the stored value of the tuning signal TUN from the non-volatile memory 132 may enable the frequency standard circuit 104 to provide the signal LFS while the apparatus 100 performs the training in response to the reference signal REF. The stored value of the tuning signal TUN may be a last good value stored before power to the apparatus 100 became unavailable. Once the training is performed in response to the reference signal REF, the tuning signal TUN determined in the step 416 may be provided to the local frequency standard circuit 104 in the step 418. The tuning value signal TUN determined from the training may be further stored in the error memory 124 (e.g., in the volatile memory 130 and/or the non-volatile memory 132 to update the last good value that was stored before power off). While the method 400 was described with reference to the components of the apparatus 100 shown in association with FIG. 4, the method 400 may also be applicable to embodiments of the apparatus 100' shown in association with FIG. 5.

Figure 11:
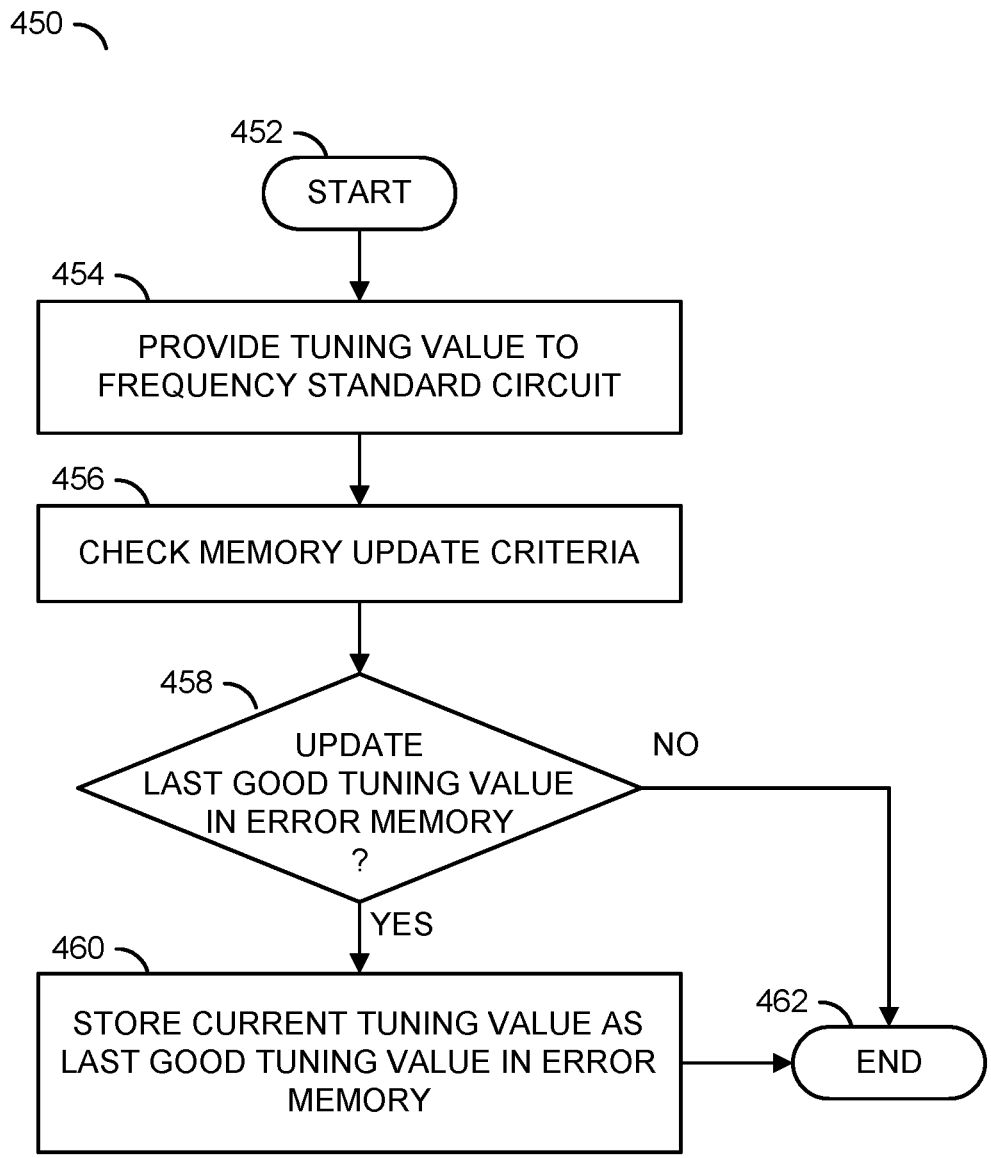
FIG. 11 is a flow diagram illustrating a method for storing a previous working value in an error memory.

Referring to FIG. 11, a method (or process) 450 is shown. The method 450 may store a previous working value in an error memory. The method 450 generally comprises a step (or state) 452, a step (or state) 454, a step (or state) 456, a decision step (or state) 458, a step (or state) 460, and a step (or state) 462.

The step 452 may start the method 450. In the step 454, the error memory 124 may provide the turning value signal TUN to the frequency standard circuit 104. Next, in the step 456, the digital controller 456 may check a memory update criteria. In an example, the digital controller 122 may comprise computer readable instructions that provide details on when and/or how often to update the error memory 124. The computer readable instructions may comprise criteria for when and/or how often to update the stored value of the tuning value signal TUN in both the volatile memory 130 and the non-volatile memory 132. Next, the method 450 may move to the decision step 458.

In the decision step 458, the digital controller 122 may determine whether to update the last good tuning value stored in the error memory 124. Details of the update criteria of the error memory 124 may be described in more detail in association with FIG. 13 and FIG. 14. If the digital controller 122 determines that the error memory 124 should be updated with the last good tuning value, then the method 450 may move to the step 460. In the step 460, the digital controller 122 may provide an instruction to the error memory 124 to store the current value of the tuning signal TUN as the last good tuning value in the error memory 124 (e.g., in the volatile memory 130 and/or the non-volatile memory 132). Next, the method 450 may move to the step 462. In the decision step 458, if the digital controller 122 determines that the error memory 124 should not be updated with the last good tuning value, then the method 450 may move to the step 462. The step 462 may end the method 450.

Figure 12:
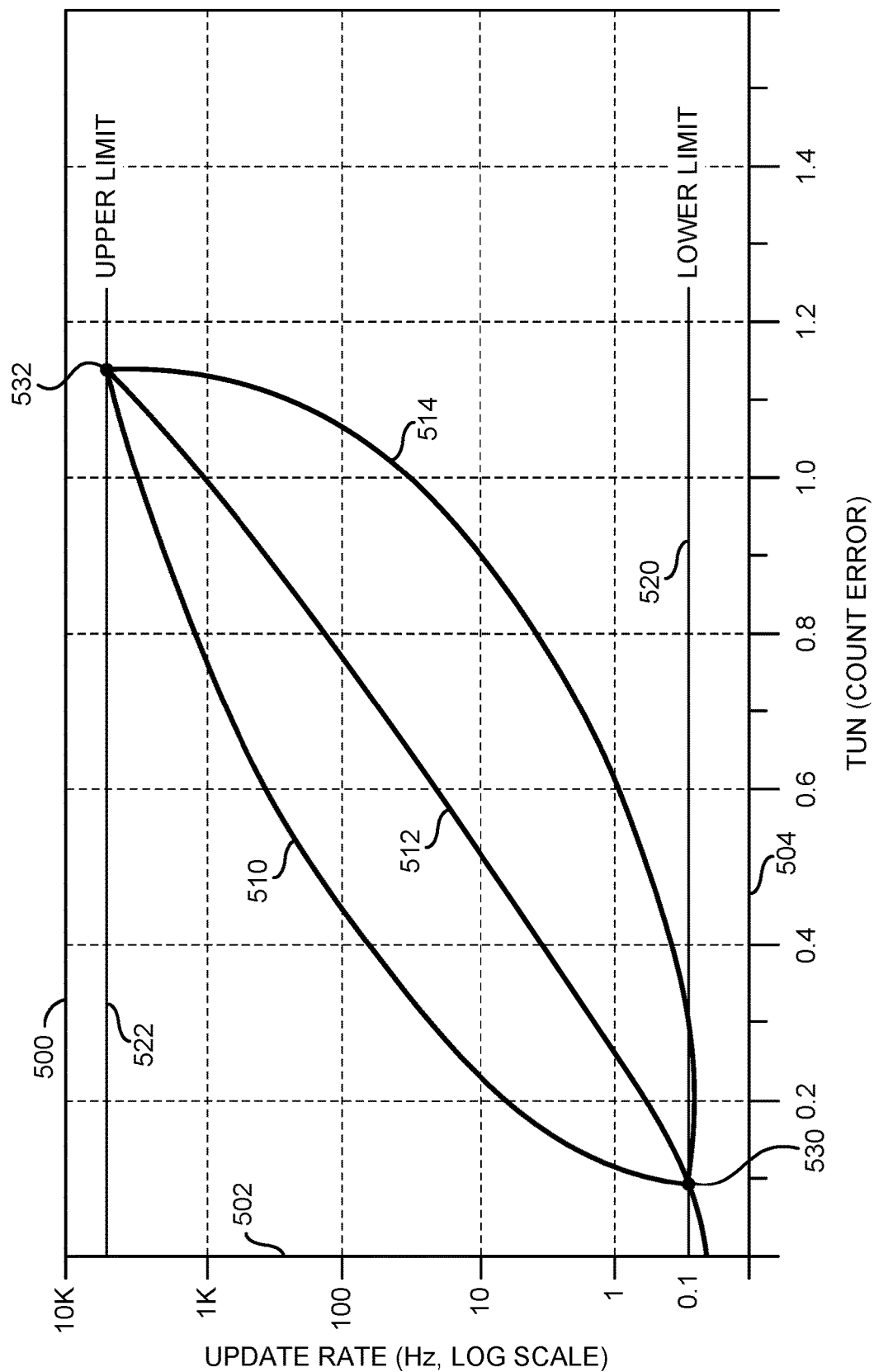
FIG. 12 is a diagram illustrating a graph of an adaptive update rate.

Referring to FIG. 12, a diagram illustrating a graph of an adaptive update rate is shown. A graph 500 is shown. The graph 500 may comprise an axis 502 and an axis 504. The axis 502 may be a Y axis representing an update rate of the frequency standard circuit 104 (e.g., shown in Hz on a logarithmic scale). The axis 504 may be an X axis representing the tuning value signal TUN (e.g., the count error).

The graph 500 may comprise a plot line 510, a plot line 512 and a plot line 514. The plot lines 510-514 may represent update rates that may be selected by the digital controller 122. In an example, each plot line 510-514 may represent an adaptive update rate that may adjust in response to the count error determined by the digital controller 122. In the example shown, the update rate of the frequency standard circuit 104 may be a function of the count error (e.g., the equation EQ1).

A horizontal line 520 and a horizontal line 522 are shown on the graph 500. The horizontal line 520 may represent a lower limit of the adaptive update rate implemented by the apparatus 100. In the example shown, the lower limit 520 may be approximately 0.1 Hz. The horizontal line 522 may represent an upper limit of the adaptive update rate implemented by the apparatus 100. In the example shown, the upper limit 522 may be approximately 8000 Hz.

The plot lines 510-514 may each be within the boundaries of the lower limit 520 and the upper limit 522. A reference point 530 and a reference point 532 are shown. The reference point 530 may represent a common lower limit value for the plot lines 510-514. In an example, with a count error of approximately 0.1, the plot lines 510-514 may each have an update rate of approximately 0.1 Hz (e.g., the lower limit 520). The reference point 532 may represent a common upper limit value for the plot lines 510-514. In an example, with a count error of approximately 1.1, the plot lines 510-514 may each have an update rate of approximately 8000 Hz (e.g., the upper limit 522).

The adaptive update rate 510 may increase an update rate relatively quickly in response to the detected count error. The adaptive update rate 512 may increase the update rate generally linearly in response to the detected count error. The adaptive update rate 514 may increase the update rate relatively slowly in response to the detected count error. Other update rate curves may be implemented. The relationship between the count error and the update rate for update rates implemented by the digital controller 122 may be varied according to the design criteria of a particular implementation.

Generally, the update rate may be inversely proportional to the bandwidth. The bandwidth of the tracking circuit 102 may be kept low to prevent undesired interference from the reference signal REF. In some embodiments, the lower limit 520 of the update rate may be as low as zero. With an update rate of zero, the tracking circuit 102 may not provide adjustments to the frequency standard circuit 104. Selecting non-zero updates rates may offer various advantages (e.g., faster updates). In some embodiments, a minimum value may be selected for the upper limit 522. In an example, the upper limit 522 may be set based on acquisition frame criteria. Generally, the characteristics of the update rate may be designed for a particular implementation (e.g., a particular shape of the update rates 510-514 may not be required).

Figure 13:
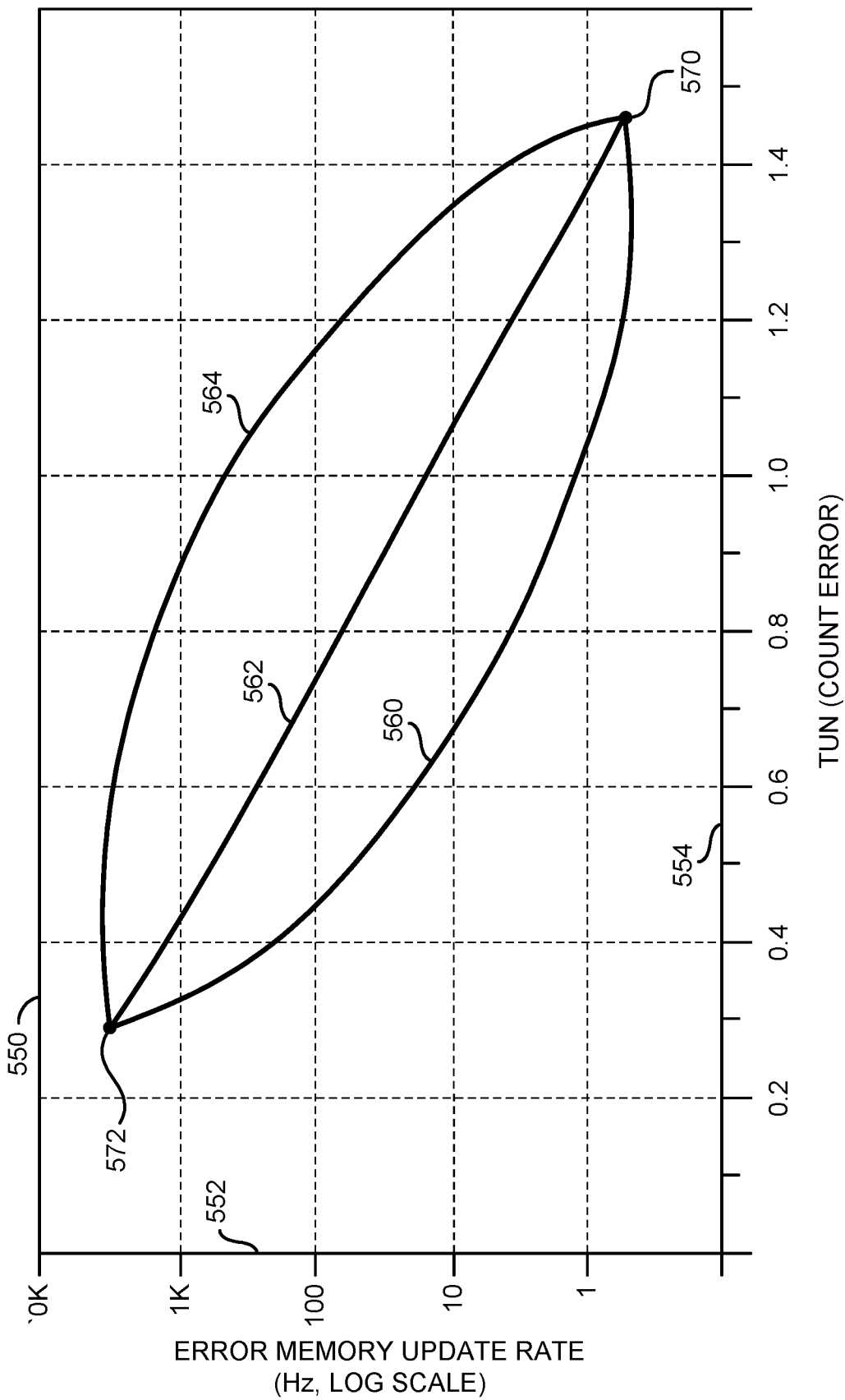
FIG. 13 is a diagram illustrating a graph of an update rate for an error memory selected in response to a tuning value.

Referring to FIG. 13, a diagram illustrating a graph of an update rate for an error memory selected in response to a tuning value is shown. A graph 550 is shown. The graph 550 may comprise an axis 552 and an axis 554. The axis 552 may be a Y axis representing an update rate of the error memory 124 (e.g., shown in Hz on a logarithmic scale). The axis 554 may be an X axis representing the tuning value signal TUN (e.g., the count error). In the example shown, the update rate of the error memory 124 may be determined in response to some characteristic of the count error.

The graph 550 may comprise a plot line 560, a plot line 562 and a plot line 564. The plot lines 560-564 may represent update rates for the error memory 124 that may be selected by the digital controller 122. In an example, each plot line 560-564 may represent an adaptive update rate that may adjust in response to the count error determined by the digital controller 122.

A reference point 570 and a reference point 572 are shown. The reference point 570 may represent a common upper limit value for the plot lines 560-564. In an example, with a count error of approximately 0.3, the plot lines 560-564 may each have an update rate of approximately 3000 Hz. The reference point 572 may represent a common lower limit value for the plot lines 560-564. In an example, with a count error of approximately 1.5, the plot lines 560-564 may each have an update rate of approximately 0.8 Hz.

The adaptive update rate 560 may decrease an update rate relatively quickly in response to the detected count error. The adaptive update rate 562 may decrease the update rate generally linearly in response to the detected count error. The adaptive update rate 564 may decrease the update rate relatively slowly in response to the detected count error. Other update rate curves may be implemented. The relationship between the count error and the update rates of the error memory 124 implemented by the digital controller 122 may be varied according to the design criteria of a particular implementation.

Generally, the lower the count error of the tuning signal TUN, the more often the error memory 124 may be updated. Frequent updates to the error memory 124 may be stored in the volatile memory 130 (e.g., for faster write access). Periodically, the tuning signal TUN may be stored in the non-volatile memory 132 to ensure a previous good value is stored in the case of power loss.

Figure 14:
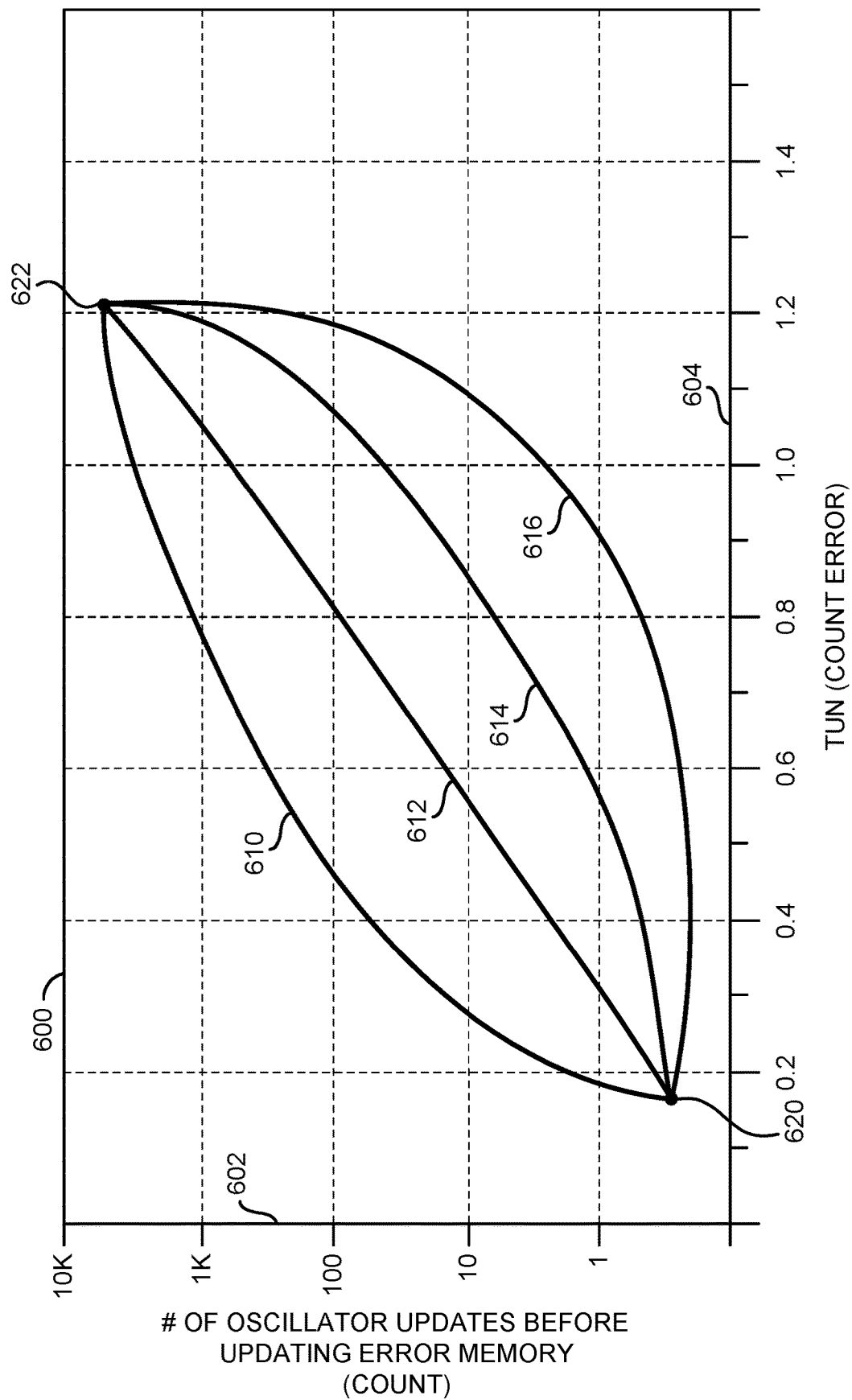
FIG. 14 is a diagram illustrating a graph of an update rate for an error memory selected in response to an oscillator count.

Referring to FIG. 14, a diagram illustrating a graph of an update rate for an error memory selected in response to an oscillator count is shown. A graph 600 is shown. The graph 600 may comprise an axis 602 and an axis 604. The axis 602 may be a Y axis representing a number of updates of the frequency standard circuit 104 before updating the error memory 124 (e.g., a count of the updates shown on a logarithmic scale). The axis 604 may be an X axis representing the tuning value signal TUN (e.g., the count error). In the example shown, the update rate of the error memory 124 may be determined in response to some characteristic between the count error and the update count.

The graph 600 may comprise a plot line 610, a plot line 612, a plot line 614 and a plot line 616. The plot lines 610-616 may represent update rates for the error memory 124 that may be selected by the digital controller 122. In an example, each plot line 610-616 may represent an adaptive update rate that may adjust in response to the count error determined by the digital controller 122 and/or a number of oscillator updates.

A reference point 620 and a reference point 622 are shown. The reference point 620 may represent a common lower limit value for the plot lines 610-616. In an example, with a count error of approximately 0.2, the plot lines 610-616 may each show that the error memory 124 may be updated after approximately one update of the frequency standard circuit 104. The reference point 622 may represent a common upper limit value for the plot lines 610-616. In an example, with a count error of approximately 1.2, the plot lines 610-616 may show that the error memory 124 may be updated after approximately 8000 updates of the frequency standard circuit 104.

The adaptive update rate 610 may increase an update rate relatively quickly in response to a number of updates of the frequency standard circuit 104. The adaptive update rate 612 may increase the update rate generally linearly in response to the number of updates of the frequency standard circuit 104. The update rate 614 may increase the update rate slightly slower than linearly in response to the number of updates of the frequency standard circuit 104. The adaptive update rate 616 may increase the update rate relatively slowly in response to the number of updates of the frequency standard circuit 104. Other update rate curves may be implemented. The relationship between the count error, the number of updates of the frequency standard circuit 104 and the update rate for the error memory 124 implemented by the digital controller 122 may be varied according to the design criteria of a particular implementation.

Generally, the higher the count error of the tuning signal TUN, the higher the number updates to the frequency standard circuit 104 before updating the error memory 124. For example, the error memory 124 may be updated less when the count error is higher.

Other methods of determining the update rate for the error memory 124 may be implemented. For example, there may not be a requirement of updating the error memory 124 every time the local frequency standard circuit 104 is updated. In some embodiments, the update rate for the error memory 124 may be on a fixed basis. In one example, the error memory 124 may be updated after a fixed amount of time (e.g., based on a time interval). In another example, the error memory 124 may be updated based on a fixed update period (e.g., update the error memory 124 after some fixed number of oscillator updates has occurred). The method of updating the error memory 124 (e.g., either the volatile memory 130 or the non-volatile memory 132) may be varied according to the design criteria of a particular implementation.

The tracking circuit 102 may be configured to update a frequency of the internal oscillator (e.g., the frequency standard circuit 104) and/or a frequency of storing the last known good value in the error memory 124. The error memory 124 may comprise the volatile memory 130 and the non-volatile memory 132. Usually, the previously used value may be stored in the volatile memory 130. Occasionally, the previously used value may be stored in the non-volatile memory 132 (e.g., to provide a usable value after a power off scenario). On power on of the apparatus 100 and/or the frequency converter 44, the non-volatile memory 132 may be read to enable the apparatus 100 to start up faster instead of performing calibration using training. The training may not be performed immediately on power on.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a frequency standard circuit configured to (i) generate an internal frequency standard and (ii) adjust said internal frequency standard in response to a tuning signal; and
a tracking circuit configured to (i) receive (a) a reference signal from an external source and (b) a feedback signal of said internal frequency standard and (ii) generate said tuning signal, wherein (i) said tuning signal is configured to synchronize said internal frequency standard to said reference signal, (ii) said internal frequency standard is implemented local to a frequency converter and (iii) said tracking circuit has a bandwidth that prevents unwanted content on said reference signal from corrupting said internal frequency standard.

2. The apparatus according to claim 1, wherein said tracking circuit comprises a plurality of counters and a controller circuit.

3. The apparatus according to claim 2, wherein said tracking circuit is configured to implement a rate adaptive tracking loop.

4. The apparatus according to claim 3, wherein said bandwidth is adaptable to enable a selection of said bandwidth to provide fast correction of a large error while being low enough to attenuate said unwanted content on said reference signal.

5. The apparatus according to claim 2, wherein said tracking circuit further comprises an error signal memory configured to enable a previous value of said internal frequency standard to be used by said frequency converter when said reference signal is unavailable.

6. The apparatus according to claim 5, wherein (i) said error signal memory comprises a volatile memory and a non-volatile memory, (ii) said previous value is written to said non-volatile memory and (iii) said previous value is read from said non-volatile memory when said frequency converter is powered on.

7. The apparatus according to claim 6, wherein said previous value stored by said non-volatile memory enables said apparatus to use said previous value when said frequency converter is powered on without training.

8. The apparatus according to claim 6, wherein (i) said previous value is written to said volatile memory and (ii) said previous value is written to said non-volatile memory less often than said volatile memory.

9. The apparatus according to claim 2, wherein said tracking circuit further comprises an integrator circuit in an error path.

10. The apparatus according to claim 1, wherein said internal frequency standard is used to derive a local oscillator frequency for said frequency converter.

11. The apparatus according to claim 1, wherein synchronizing said internal frequency standard to said reference signal prevents a frequency of said internal frequency standard from drifting.

12. The apparatus according to claim 1, wherein said unwanted content comprises noise caused by at least one of: use of optical circuits to carry said reference signal and use of a bias-T to mix prime power with said reference signal.

13. The apparatus according to claim 1, wherein said frequency converter is implemented as part of a satellite communication system.

14. The apparatus according to claim 1, wherein said tracking circuit is configured to implement a phase-locked loop.

15. The apparatus according to claim 14, wherein said phase-locked loop is configured to implement a rate adaptive tracking loop.

16. The apparatus according to claim 14, wherein said tracking circuit further comprises a switchable error memory configured to enable said frequency standard circuit to continue to operate at a previous frequency set by said phase-locked loop when said reference signal is unavailable.

17. The apparatus according to claim 1, wherein (i) said tracking circuit comprises a digital tracking system using frequency counters and long counting periods and (ii) said digital tracking system comprises a rate adaptive tracking loop with rate bounds set according to system-level parameters on (a) lock time and (b) noise performance.

18. The apparatus according to claim 1, further comprising (i) a bias-T circuit configured to separate power from said reference signal and an intermediate frequency signal and (ii) an amplifier, wherein said amplifier (a) uses a nonlinear bias and (b) draws said power through said bias-T circuit from a line that also carries said reference signal.

19. The apparatus according to claim 1, wherein said frequency standard circuit is implemented as a high-purity oscillator configured to be synchronized with said reference signal by said tracking circuit.

20. The apparatus according to claim 19, wherein said high-purity oscillator is a dielectric resonator oscillator.

* * * * *